(12) United States Patent
Selvaganapathy et al.

(10) Patent No.: US 12,279,168 B2
(45) Date of Patent: Apr. 15, 2025

(54) CONDITIONAL HANDOVER IN A DUAL CONNECTIVITY SYSTEM

(71) Applicant: NOKIA TECHNOLOGIES OY, Espoo (FI)

(72) Inventors: Srinivasan Selvaganapathy, Bangalore (IN); Ahmad Awada, Munich (DE); Amaanat Ali, Espoo (FI); Ingo Viering, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 444 days.

(21) Appl. No.: 17/754,054

(22) PCT Filed: Nov. 5, 2020

(86) PCT No.: PCT/EP2020/081099
§ 371 (c)(1),
(2) Date: Mar. 22, 2022

(87) PCT Pub. No.: WO2021/089684
PCT Pub. Date: May 14, 2021

(65) Prior Publication Data
US 2022/0369181 A1 Nov. 17, 2022

(30) Foreign Application Priority Data
Nov. 7, 2019 (IN) .............................. 201941045295

(51) Int. Cl.
*H04W 36/00* (2009.01)
(52) U.S. Cl.
CPC .......................... *H04W 36/00698* (2023.05)

(58) Field of Classification Search
CPC ......... H04W 36/0005; H04W 36/0016; H04W 36/0022; H04W 36/00222;
(Continued)

(56) References Cited

U.S. PATENT DOCUMENTS

| 10,383,009 B2 * | 8/2019 | Chiba ................. H04W 36/324 |
| 2015/0373608 A1 | 12/2015 | Zhu et al. |

(Continued)

FOREIGN PATENT DOCUMENTS

| CA | 3021658 A1 * | 4/2019 | ............. H04L 69/04 |
| CN | 108990116 A | 12/2018 | |
| CN | 109756994 A | 5/2019 | |
| CN | 110351790 A | 10/2019 | |
| EP | 3416423 A1 * | 12/2018 | ............ H04W 24/10 |
| EP | 3758415 A1 | 12/2020 | |

(Continued)

OTHER PUBLICATIONS

"3rd Generation Partnership Project; Technical Specification Group Radio Access Network; Evolved Universal Terrestrial Radio Access (E-UTRA) and NR; Multi connectivity; Stage 2 (Release 15)", 3GPP TS 37.340, V15.6.0, Jun. 2019, pp. 1-69.

(Continued)

*Primary Examiner* — Kevin D Mew
(74) *Attorney, Agent, or Firm* — Lippes Mathias LLP

(57) ABSTRACT

Various example embodiments relate to signaling and execution of a conditional handover in a dual connectivity system. Different conditional handover connectivity configurations may be provided for a client node such that an appropriate connectivity configuration can be selected at the time of triggering execution the conditional handover. Apparatuses, methods, and computer programs are disclosed.

19 Claims, 11 Drawing Sheets

(58) Field of Classification Search
CPC ......... H04W 36/0058; H04W 36/0061; H04W 36/0066; H04W 36/0069; H04W 36/00698; H04W 36/0083; H04W 36/00837; H04W 36/0085
See application file for complete search history.

(56) References Cited

U.S. PATENT DOCUMENTS

| | | | | |
|---|---|---|---|---|
| 2016/0337924 | A1* | 11/2016 | Ohta | H04W 36/087 |
| 2018/0035339 | A1* | 2/2018 | Mitsui | H04W 36/08 |
| 2018/0035485 | A1 | 2/2018 | Lee et al. | |
| 2018/0324663 | A1* | 11/2018 | Park | H04W 36/22 |
| 2019/0253937 | A1 | 8/2019 | Hsieh | |
| 2019/0253945 | A1 | 8/2019 | Paladugu et al. | |
| 2020/0169922 | A1* | 5/2020 | Ozturk | H04W 36/0027 |
| 2020/0178140 | A1* | 6/2020 | Xu | H04W 36/18 |
| 2020/0252838 | A1* | 8/2020 | Akdeniz | H04W 36/0061 |
| 2021/0092655 | A1* | 3/2021 | Zhang | H04W 36/0094 |
| 2021/0168674 | A1* | 6/2021 | He | H04W 36/0069 |
| 2021/0258843 | A1* | 8/2021 | Awada | H04W 36/00838 |
| 2021/0410039 | A1* | 12/2021 | Da Silva | H04W 76/19 |
| 2022/0030484 | A1* | 1/2022 | Cheng | H04W 36/0058 |
| 2023/0388871 | A1* | 11/2023 | Guo | H04W 36/0069 |
| 2024/0155450 | A1* | 5/2024 | Gürsu | H04W 36/0058 |

FOREIGN PATENT DOCUMENTS

| | | | | |
|---|---|---|---|---|
| WO | WO-2018063083 | A1 * | 4/2018 | ........ H04W 36/0072 |
| WO | 2018/175721 | A1 | 9/2018 | |
| WO | WO-2018203300 | A1 * | 11/2018 | ........ H04W 36/0069 |
| WO | 2018/227452 | A1 | 12/2018 | |
| WO | 2019/039672 | A1 | 2/2019 | |
| WO | 2019/097470 | A1 | 5/2019 | |
| WO | 2019161742 | A1 | 8/2019 | |
| WO | 2019195060 | A1 | 10/2019 | |
| WO | WO-2019192150 | A1 * | 10/2019 | |
| WO | WO-2024014787 | A1 * | 1/2024 | |

OTHER PUBLICATIONS

"New Work Item on even further Mobility enhancement in E-UTRAN", 3GPP TSG RAN Meeting #80, RP-181337, Agenda Item: 10.1.1, China Telecom, Jun. 11-14, 2018, 4 pages.

"New WID: NR mobility enhancements", 3GPP TSG RAN Meeting #80, RP-181433, Agenda Item: 9.1.10, Intel Corporation, May 21-25, 2018, 5 pages.

Msc-generator, Sourceforge, Retrieved Apr. 3, 2024, Webpage available at : https://sourceforge.net/projects/msc-generator.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.6.0, Jun. 2019, pp. 1-960.

"3rd Generation Partnership Project; Technical Specification Group Radio Access Network; NR; Radio Resource COntrol (RRC) protocol specification (Release 15)", 3GPP TS 38.331, V15.6.0, Jun. 2019, pp. 1-519.

"On Rel-17 Further CPAC functionalities", 3GPP TSG-RAN WG2 Meeting #113 Electronic, R2-2100532, Agenda item: 8.2.3, Nokia, Jan. 25-Feb. 5, 2021, 3 pages.

"Reuse of conditional handover for SCG change in NR-DC", 3GPP TSG-RAN WG2 #107, R2-1909144, Agenda item: 11.9.3.6, NEC, Aug. 26-30, 2019, 3 pages.

IEEE 802.11, Wikipedia, Retrieved on Apr. 5, 2024, Webpage available at : https://en.wikipedia.org/wiki/IEEE_802.11.

Office Action received for corresponding Chinese Patent Application No. 202080077715.0, dated Feb. 29, 2024, 10 pages of Office Action and No. page of translation available.

International Search Report and Written Opinion for International Application No. PCT/EP2020/081099, mailed on Feb. 9, 2021, 18 pages.

3GPP TSG-RAN WG2 #107bis, R2-1912983; "Applicability of CHO Agreements to Conditional PSCell Change"; Agenda item: 6.9.4 Conditional PSCell addition/change; Source: NEC; Chongqing, China; Oct. 14-18, 2019; 11 pages.

3GPP TSG-RAN WG2 Meeting #107bis, R2-1913908 (Resubmission of R2-1911410); "Discussion on Performing CHO Instead of RRE in CHO"; Agenda item: 6.9.3.2; Source: Samsung, Nokia, Nokia Shanghai Bell, Qualcomm Incorporated; WID/SID: NR_Mob_Enh—Release 16; Chongqing, China; Sep. 14-18, 2019; 4 pages.

3GPP TSG RAN WG2 Meeting #107bis, R2-1913483; "Further Issues for CHO Configuration and Execution"; Agenda item: 6.9.3.1; Source: ZTE Corporation, Sanchips; Chongqing, China; Oct. 14-18, 2019; 8 pages.

Office Action for India Application No. 202247031654, mailed on Sep. 29, 2022, 8 pages.

* cited by examiner

CONDITIONAL HANDOVER IN A DUAL CONNECTIVITY SYSTEM

CROSS-REFERENCE TO RELATED APPLICATIONS

This application is a national stage entry of International Application No. PCT/EP2020/081099, filed Nov. 5, 2020, entitled "CONDITIONAL HANDOVER IN A DUAL CONNECTIVITY SYSTEM" which claims the benefit of Indian Application No. 201941045295, filed Nov. 7, 2019, both of which are hereby incorporated by reference in their entireties.

TECHNICAL FIELD

Various example embodiments generally relate to the field of wireless communications. In particular, some example embodiments relate to signaling and execution of a conditional handover in a cellular communication network with dual connectivity.

BACKGROUND

In various wireless communication technologies, such as 3GPP long-term evolution (LTE) 4G and 5G new radio (NR), a client node, such as a mobile phone, may be handed over from one base station to another. Furthermore, the handover may be performed in a dual connectivity scenario, where the client node may simultaneously communicate with two base stations to increase data throughput.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide an improved conditional handover procedure that enables to reduce signaling overhead and improve reliability and throughput of a dual connectivity system. These benefits may be achieved by the features of the independent claims. Further implementation forms are provided in the dependent claims, the description, and the drawings.

According to an aspect, an apparatus comprises at least one processor and at least one memory including computer program code, the at least one memory and the computer code configured to, with the at least one processor, cause the apparatus at least to: establish a first connection to a source master node; establish a second connection to a source secondary node; receive, from the source master node, at least one indication of a plurality of conditional handover connectivity configurations; detect triggering of execution of a conditional handover; select a conditional handover connectivity configuration from the plurality of conditional handover connectivity configurations based on at least one condition associated with the second connection; and execute the conditional handover based on the selected conditional handover connectivity configuration.

According to an aspect, a method comprises establishing a first connection to a source master node; establishing a second connection to a source secondary node; receiving, from the source master node, at least one indication of a plurality of conditional handover connectivity configurations; detecting triggering of execution of a conditional handover; selecting a conditional handover connectivity configuration from the plurality of conditional handover connectivity configurations based on at least one condition associated with the second connection; and executing the conditional handover based on the selected conditional handover connectivity configuration.

According to an aspect, a computer program is configured, when executed by an apparatus, to cause the apparatus at least to: establish a first connection to a source master node; establish a second connection to a source secondary node; receive, from the source master node, at least one indication of a plurality of conditional handover connectivity configurations; detect triggering of execution of a conditional handover; select a conditional handover connectivity configuration from the plurality of conditional handover connectivity configurations based on at least one condition associated with the second connection; and execute the conditional handover based on the selected conditional handover connectivity configuration.

According to an aspect, an apparatus comprises means for establishing a first connection to a source master node; means for establishing a second connection to a source secondary node; means for receiving, from the source master node, at least one indication of a plurality of conditional handover connectivity configurations; means for detecting triggering of execution of a conditional handover; means for selecting a conditional handover connectivity configuration from the plurality of conditional handover connectivity configurations based on at least one condition associated with the second connection; and means for executing the conditional handover based on the selected conditional handover connectivity configuration.

According to an aspect, an apparatus comprises at least one processor and at least one memory including computer program code, the at least one memory and the computer code configured to, with the at least one processor, cause the apparatus at least to: receive, from a source master node, a handover request associated with a client node, wherein the handover request comprises an indication of a source secondary node associated with the client node and a handover type indicating conditional handover; prepare a plurality of conditional handover connectivity configurations for the client node; and transmit, to the source master node, an indication of the plurality of conditional handover connectivity configurations and an indication of at least one condition for selecting a conditional handover connectivity configuration from the plurality of conditional handover connectivity configurations upon triggering of the conditional handover.

According to an aspect, a method comprises receiving, from a source master node, a handover request associated with a client node, wherein the handover request comprises an indication of a source secondary node associated with the client node and a handover type indicating conditional handover; preparing a plurality of conditional handover connectivity configurations for the client node; and transmitting, to the source master node, an indication of the plurality of conditional handover connectivity configurations and an indication of at least one condition for selecting a conditional handover connectivity configuration from the plurality of conditional handover connectivity configurations upon triggering of the conditional handover.

According to an aspect, a computer program is configured, when executed by an apparatus, to cause the apparatus at least to receive, from a source master node, a handover request associated with a client node, wherein the handover request comprises an indication of a source secondary node associated with the client node and a handover type indicating conditional handover; prepare a plurality of conditional handover connectivity configurations for the client node; transmit, to the source master node, an indication of the plurality of conditional handover connectivity configurations and an indication of at least one condition for selecting a conditional handover connectivity configuration from the plurality of conditional handover connectivity configurations upon triggering of the conditional handover.

According to an aspect, an apparatus comprises means for receiving, from a source master node, a handover request associated with a client node, wherein the handover request comprises an indication of a source secondary node associated with the client node and a handover type indicating conditional handover; means for preparing a plurality of conditional handover connectivity configurations for the client node; and means for transmitting, to the source master node, an indication of the plurality of conditional handover connectivity configurations and an indication of at least one condition for selecting a conditional handover connectivity configuration from the plurality of conditional handover connectivity configurations upon triggering of the conditional handover.

According to an aspect, an apparatus comprises at least one processor and at least one memory including computer program code, the at least one memory and the computer code configured to, with the at least one processor, cause the apparatus at least to: transmit, to a target master node, a handover request comprising an indication of a source secondary node associated with a client node and a handover type indicating conditional handover; receive, from the target master node, an indication of a plurality of conditional handover connectivity configurations for the client node and an indication of at least one condition for selecting a conditional handover connectivity configuration from the plurality of conditional handover connectivity configurations; and transmit, to the client node, the indication of the plurality of conditional handover connectivity configurations and the indication of at least one condition for selecting the conditional handover connectivity configuration.

According to an aspect, a method comprises transmitting, to a target master node, a handover request comprising an indication of a source secondary node associated with a client node and a handover type indicating conditional handover; receiving, from the target master node, an indication of a plurality of conditional handover connectivity configurations for the client node and an indication of at least one condition for selecting a conditional handover connectivity configuration from the plurality of conditional handover connectivity configurations; and transmitting, to the client node, the indication of the plurality of conditional handover connectivity configurations and the indication of at least one condition for selecting the conditional handover connectivity configuration.

According to an aspect, a computer program is configured, when executed by an apparatus, to cause the apparatus at least to: transmit, to a target master node, a handover request comprising an indication of a source secondary node associated with a client node and a handover type indicating conditional handover; receive, from the target master node, an indication of a plurality of conditional handover connectivity configurations for the client node and an indication of at least one condition for selecting a conditional handover connectivity configuration from the plurality of conditional handover connectivity configurations; and transmit, to the client node, the indication of the plurality of conditional handover connectivity configurations and the indication of at least one condition for selecting the conditional handover connectivity configuration.

According to an aspect, an apparatus comprises means for transmitting, to a target master node, a handover request comprising an indication of a source secondary node associated with a client node and a handover type indicating conditional handover; means for receiving, from the target master node, an indication of a plurality of conditional handover connectivity configurations for the client node and an indication of at least one condition for selecting a conditional handover connectivity configuration from the plurality of conditional handover connectivity configurations; and means for transmitting, to the client node, the indication of the plurality of conditional handover connectivity configurations and the indication of at least one condition for selecting the conditional handover connectivity configuration.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, a client node may communicate with a network in a dual connectivity configuration comprising connections to a source master node and a source secondary node. The client node may be mobile and therefore it may need to be handed over to a target master node. In case of a conditional handover, the client node may be instructed in a handover command to execute the handover based on at least one condition that triggers execution of the handover. Due to the conditional nature of the handover, it may not be possible to predict radio conditions at the time of executing the handover. Therefore, different conditional handover connectivity configurations may be provided such that an appropriate connectivity configuration can be selected at the time of triggering execution of the conditional handover. The different conditional handover connectivity configurations may comprise a single connectivity configuration with the target master node and a dual connectivity configuration with the target master node and a secondary node.

Figure 1:
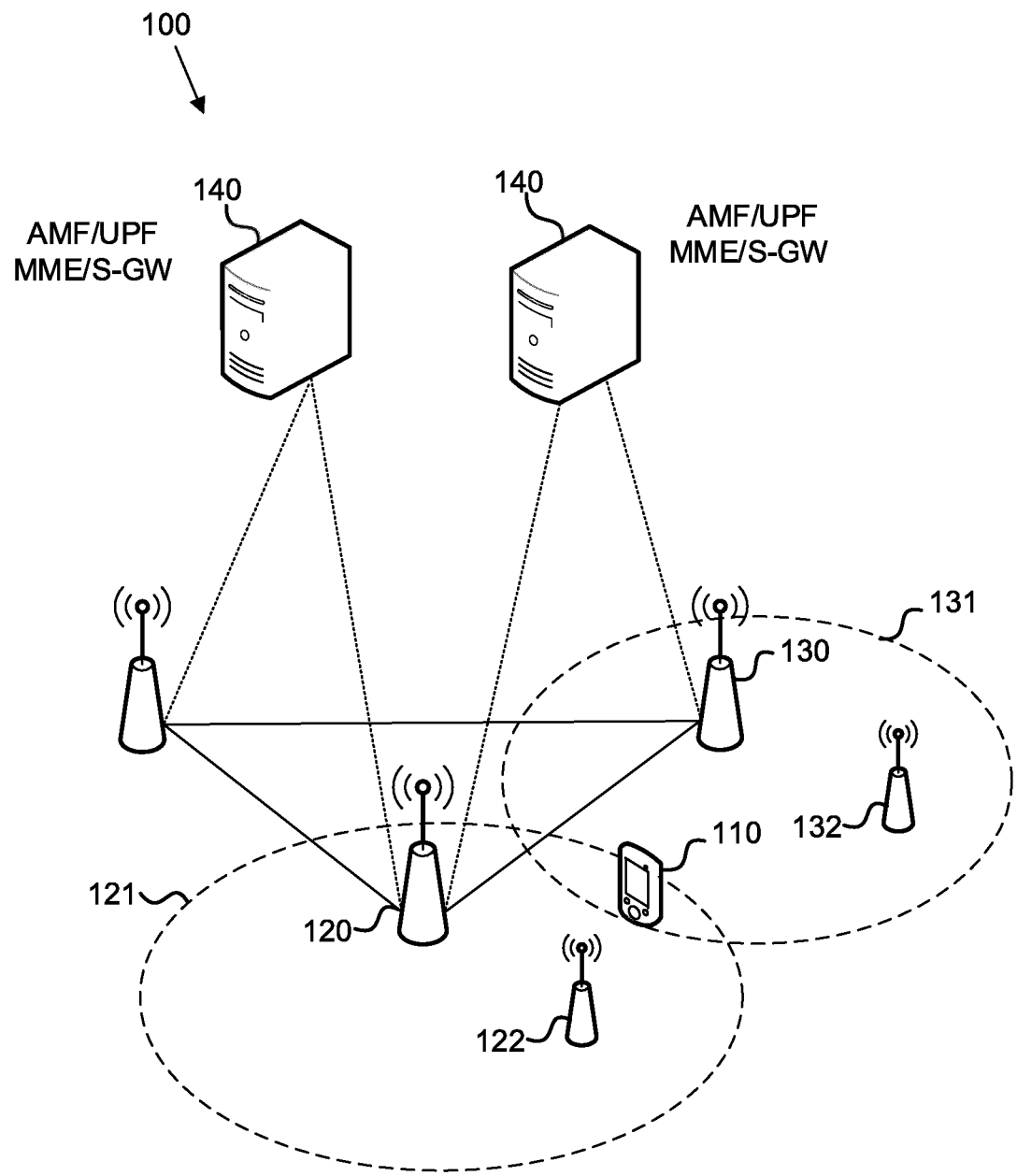
FIG. 1 illustrates an example of a network comprising network nodes and a client node, according to an example embodiment.

FIG. 1 illustrates an example embodiment of a network 100. The network 100 may comprise one or more core network elements 140. The core network elements may for example comprise one or more access and mobility management Functions (AMF) and/or user plane functions (UPF), for example in accordance with the 3GPP 5G-NR (3$^{rd}$ Generation Partnership Project 5G New Radio) standard. Alternatively, or additionally, the core network elements 140 may comprise one or more mobility management entities (MME) and/or serving gateways (S-GW), for example in accordance with the 3GPP LTE (Long Term Evolution) standard. Network 100 may further comprise at least one client node 110, which may be also referred to as a user node or user equipment (UE). UE 110 may communicate with one or more base stations 120, 122, 130, 132 over wireless radio channel(s). Base stations may be also called radio access network (RAN) nodes. In general, a base station may comprise any suitable radio access point.

Network 100 may be configured to support dual connectivity (DC), which enables to improve data throughput by allowing UE 110 to simultaneously utilize resources of two base stations, for example master node 120 and secondary node 122 or master node 130 and secondary node 132. Responsibility for communicating with UE 110 may be shared between master and secondary nodes. For example, master node 120 may be configured to handle control plane communication and at least part of user plane communication associated with UE 110. Secondary node 122 may be configured to provide additional radio resources for user plane communications for UE 110 in parallel with the master node 120. UE 110 may be simultaneously connected with master node 120 and secondary node 122. Similarly, UE 110 could be simultaneously connected to master node 130 and secondary node 132. When UE is connected to a bases station, it may be in a particular radio resource control (RRC) state, for example an RRC_CONNECTED state. A master cell group (MCG) may comprise a group of serving cells associated with the master node 120, 130. The MCG may comprise a primary cell and optionally one or more secondary cells. A secondary cell group (SCG) may comprise a group of serving cells associated with the secondary node 122, 132. The SCG may also comprise a primary cell and optionally one or more secondary cells.

Dual connectivity may enable UE 110 to establish simultaneous connections with same or different type of network nodes. For example, UE 110 may be configured to communicate with a 5G master node (master gNB, MgNB) and a 4G secondary node (secondary eNB, SeNB), or vice versa. In general, UE 110 may be connected to more than two network nodes, and therefore the example embodiments described herein are not limited to dual connectivity. For example, UE 110 could be simultaneously connected to one master node and a plurality of secondary nodes, to leverage radio resources of a plurality of additional base stations.

Master nodes 120 and 130 may be associated with respective coverage areas 121, 131. When a dual connectivity enabled UE 110 moves from coverage area 121 to coverage area 131, network 100 may be configured to perform handover from master node 120 and secondary node 122 to master node 132 and optionally the secondary node 132, or another secondary node.

The master nodes 120, 130 and secondary nodes 122, 132 may be configured to communicate with the core network elements 140 over a communication interface, such as for example control plane or user plane interface NG-C/U of the 5G system or an X2 interface of the 4G E-UTRAN (Evolved Universal Terrestrial Radio Access Network). Functionality of a RAN node may be distributed between a central unit (CU), for example a gNB-CU, and one or more distributed units (DU), for example one or more gNB-DUs. Network elements such as eNB, gNB, gNB-CU, and gNB-DU, AMF, UPF, MME, or S-GW may be generally referred to as network nodes or network devices. Although depicted as a single device, a network node may not be a stand-alone device. Instead, a network node may be for example comprise a distributed computing system coupled to a remote radio head. For example, a cloud radio access network (cRAN) may be applied to split control of wireless functions to optimize performance and cost.

Various signaling information may be exchanged in network 100 to provide information related to transmission parameters and allocation of radio resources for data transmission. Signaling information may be provided on various levels of a protocol stack.

Radio resource control (RRC) may refer to provision of radio resource related control data. Radio resource control messages may be transmitted on various logical control channels such as for example a common control channel (CCCH) or a dedicated control channel (DCCH). Logical control channels may be mapped to one to more signaling radio bearers (SRB).

Although some example embodiments have been described using particular RRC messages as examples, it is appreciated that any suitable message(s) may be configured to carry the handover related signaling information described herein. Even though some example embodiments have been described using the 4G and/or 5G networks as examples, it is appreciated that example embodiments presented herein are not limited to these example networks and may be applied in any present or future communication networks, for example other type of cellular networks, short-range wireless networks, broadcast networks, or the like.

Figure 2:
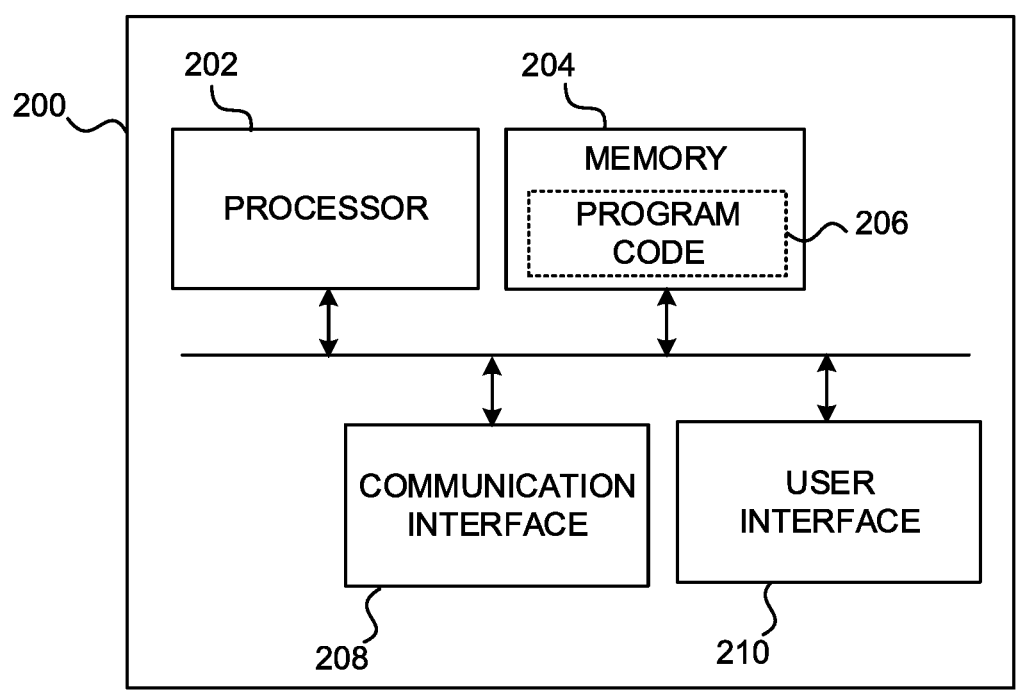
FIG. 2 illustrates an example of an apparatus configured to perform a handover procedure, according to an example embodiment.

FIG. 2 illustrates an example embodiment of an apparatus 200, for example a client node such as UE 110, a network node such as a master node 120, 130 or a secondary node 122, 132, or another network node acting as a secondary node. Apparatus 200 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise communication interface 208 configured to enable apparatus 200 to transmit and/or receive information, for example signaling information or data packets to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 206 comprised, for example, in the memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, apparatus 200 may comprise a vehicle such as for example a car. Although apparatus 200 is illustrated as a single device it is appreciated that, wherever applicable, functions of apparatus 200 may be distributed to a plurality of devices, for example to implement example embodiments as a cloud computing service.

Figure 3:
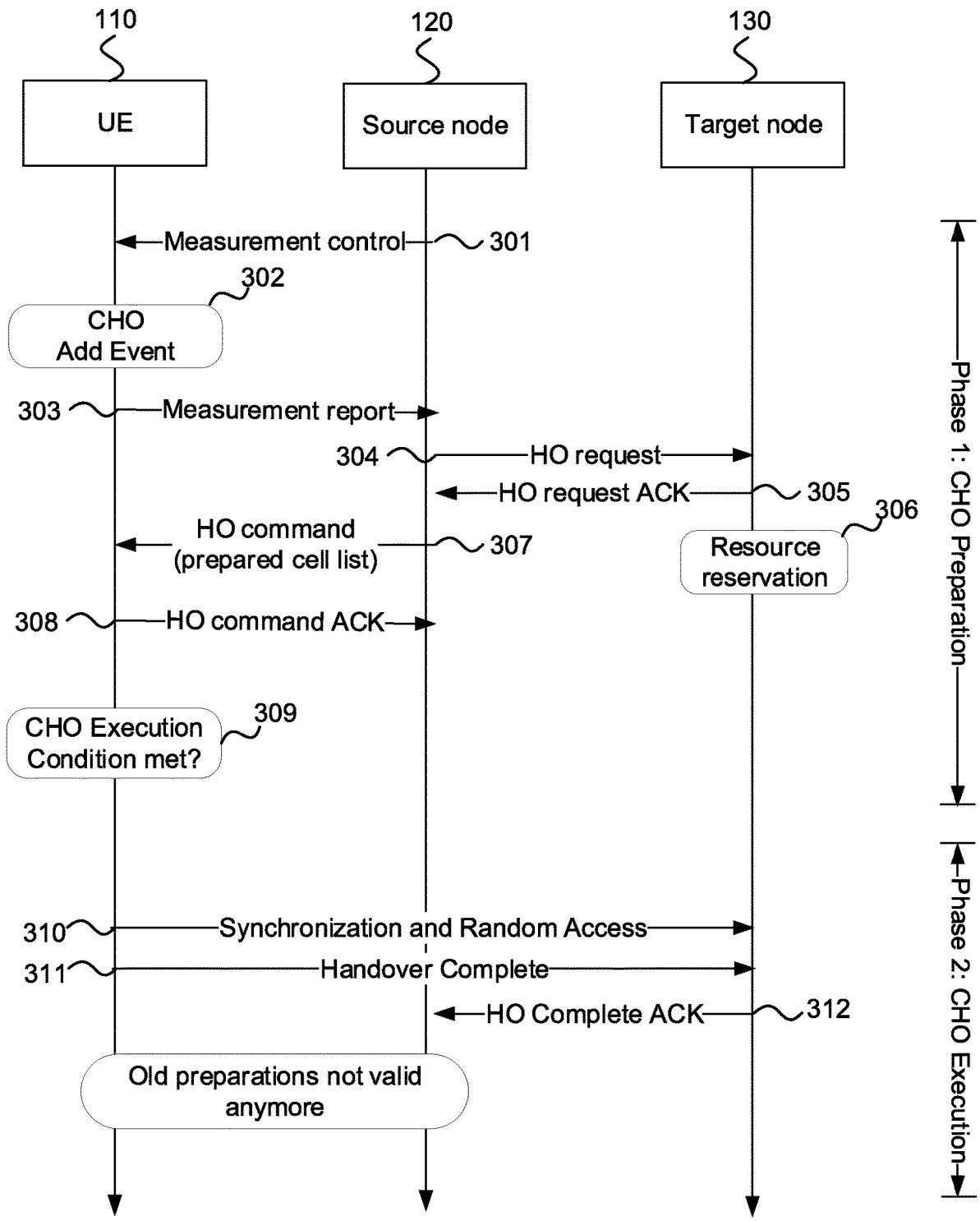
FIG. 3 illustrates an example of a conditional handover procedure involving a client node, a source network node, and a target network node, according to an example embodiment.

FIG. 3 illustrates an example of a conditional handover procedure involving a UE 110, a source node 120 and a target node 130. In general, a source node may comprise a network node that is initially serving a UE. A target node may comprise a network node that is initially not serving the UE, but which will take responsibility for serving the UE after the handover. A handover may be performed when a UE 110 transits from coverage area of the source node 120 to coverage area of the target node 130. A conditional handover (CHO) may comprise executing a handover in response to detecting triggering of at least one condition or event. In case of an unconditional handover, the UE 110 may immediately execute the handover in response to receiving a handover command. However, in case of conditional handover, the UE 110 may wait until detecting a particular condition or event and execute the handover after detecting the condition or event. A conditional handover may comprise a conditional handover preparation phase and a conditional handover execution phase, as illustrated in FIG. 3.

Before handover, UE 110 and source node 120 may transmit and/or receive data, for example as one or more data packets, to/from each other. UE 110 may be configured to receive downlink signals from source node 120 and transmit uplink signals to source node 120, and vice versa. At 301, source node 120 may transmit a measurement control message to UE 110, for example to configure UE 110 to measure strength and/or quality of signal(s) received from one or more network nodes. The measurement control message may comprise an indication of at least one conditional handover related measurement event, which the UE 110 may add in operation 302 in a list of measurement events, in response to receiving the measurement control message 301. At 303, UE 110 may transmit at least one measurement report to source node 120, for example in response to detecting triggering of the conditional handover related measurement event. Sending the measurement report may be triggered for example if the measured signal strength or quality associated with the source node 120 and/or other network nodes satisfies at least one condition, for example a threshold indicated in the measurement control message. The measurement event added at 302 does not need to be related to a conditional handover. A conditional handover may be also executed after sending measurement reports for any configured handover measurement event, for example if conditional handover type is later indicated in a handover command message.

Based on the measurement report received from UE 110, the source node 120 may be configured to prepare target node 130, or a plurality of candidate target cells associated with target node 130, for handover. At 304, the source node 120 may transmit a handover request message to target node 130 to prepare the target node 130 for handover. At 305, the target node 130 may acknowledge reception of the handover request message by sending a handover request message acknowledgement to the source node 120. At 306, the target node 130 may reserve resources for UE 110.

At 307, in response to receiving the handover request acknowledgement from the target node 130, the source node 120 may send a handover command message to the UE 110. The handover command message may comprise a prepared cell list, which may indicate one or more target cells of the target node 130. At 308, source node 120 may acknowledge reception of the handover command with a handover command acknowledgement message. This may end the conditional handover preparation phase.

The handover command message 307 may comprise at least one handover execution condition. The handover execution condition may be different from the conditional handover measurement event added at operation 302, which may be associated with triggering the measurement report and not execution of the handover. At 309, UE 110 may determine whether the handover execution condition is met. If the handover execution condition is met, the UE may determine to perform the handover to target node 130. This may comprise synchronizing with the target node 130, at 310. Transmitted synchronization information may comprise signalling information, such as for example one or more system information blocks, and/or one or more synchronization signals, such as for example reference signals embedded in the transmitted waveform. Furthermore, a random access (RA) procedure may be used to connect with the target node 130. For example, UE 110 may transmit a random access preamble, which may take various formats and which may for example comprise a signature identifying the UE 110. In general, the random access procedure may comprise a connection request to the target node 130. The RA preamble may be transmitted for example on a physical random access channel (PRACH) and it may be used to obtain uplink synchronization between UE 110 and target node 130 and to obtain resources for transmitting further signalling messages. If the handover execution condition is not met, the UE 110 may determine not to perform the handover at this point.

At 311, UE 110 may send a handover complete message to the target node 130. At 312, the conditional handover execution phase may be ended upon transmission of the handover complete acknowledgement message by the target node 130. After completing the handover, the old handover preparations may not be valid anymore. Therefore, UE 110 and/or the source node 120 may be configured to delete or disregard the handover preparation data, for example the cell list associated with the handover command sent at 307.

An advantage of the conditional handover execution is that the handover command can be sent in advance, for example when the UE 110 is still safely within the coverage area 121 of the source node 120. It also reduces the risk of failing to access the target node 130 and the stability of the radio link to the target node 130.

Figure 4A:
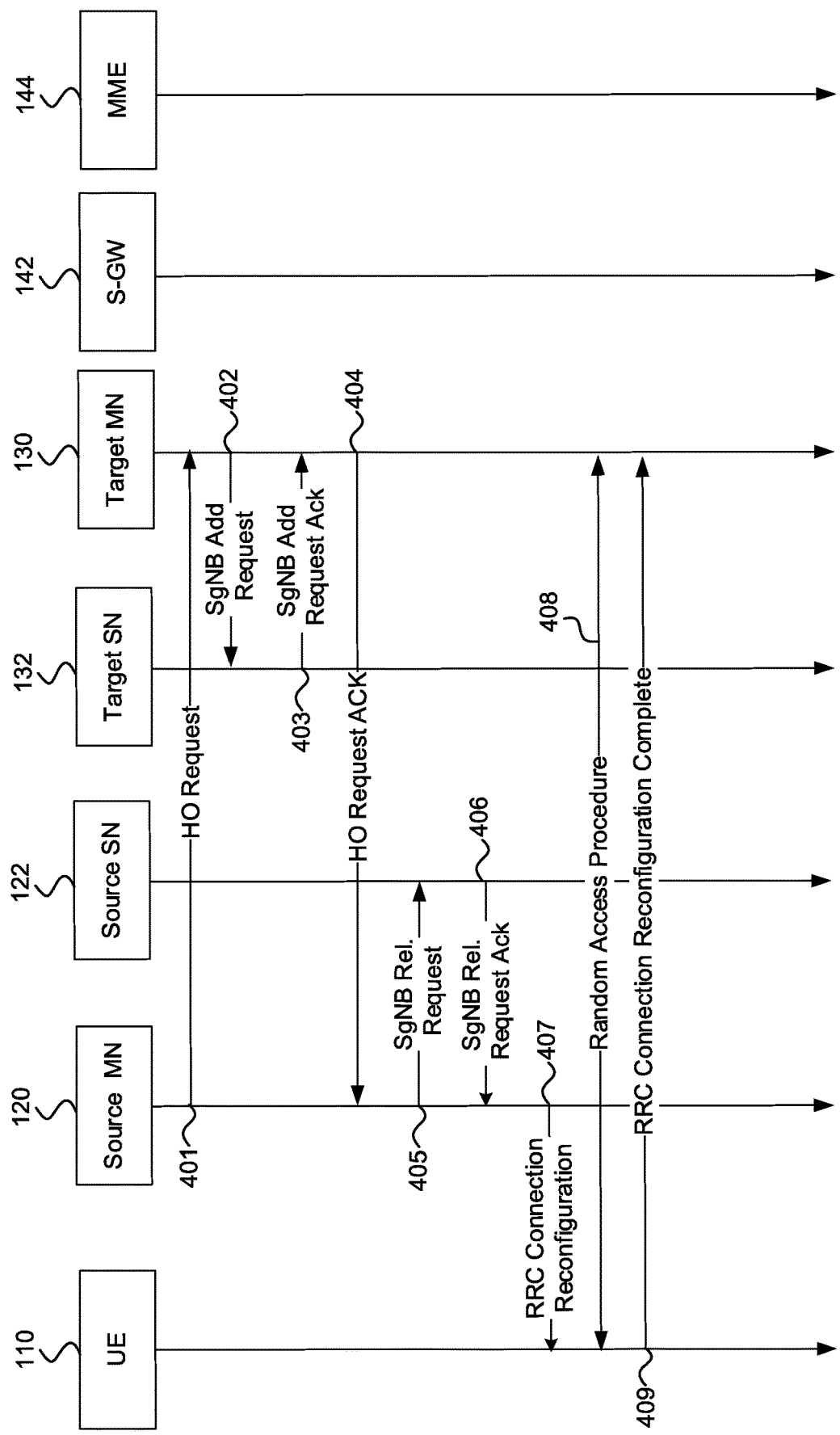
FIG. 4A and FIG. 4B illustrate an example of a handover procedure in a dual connectivity scenario, according to an example embodiment.
Figure 4B:
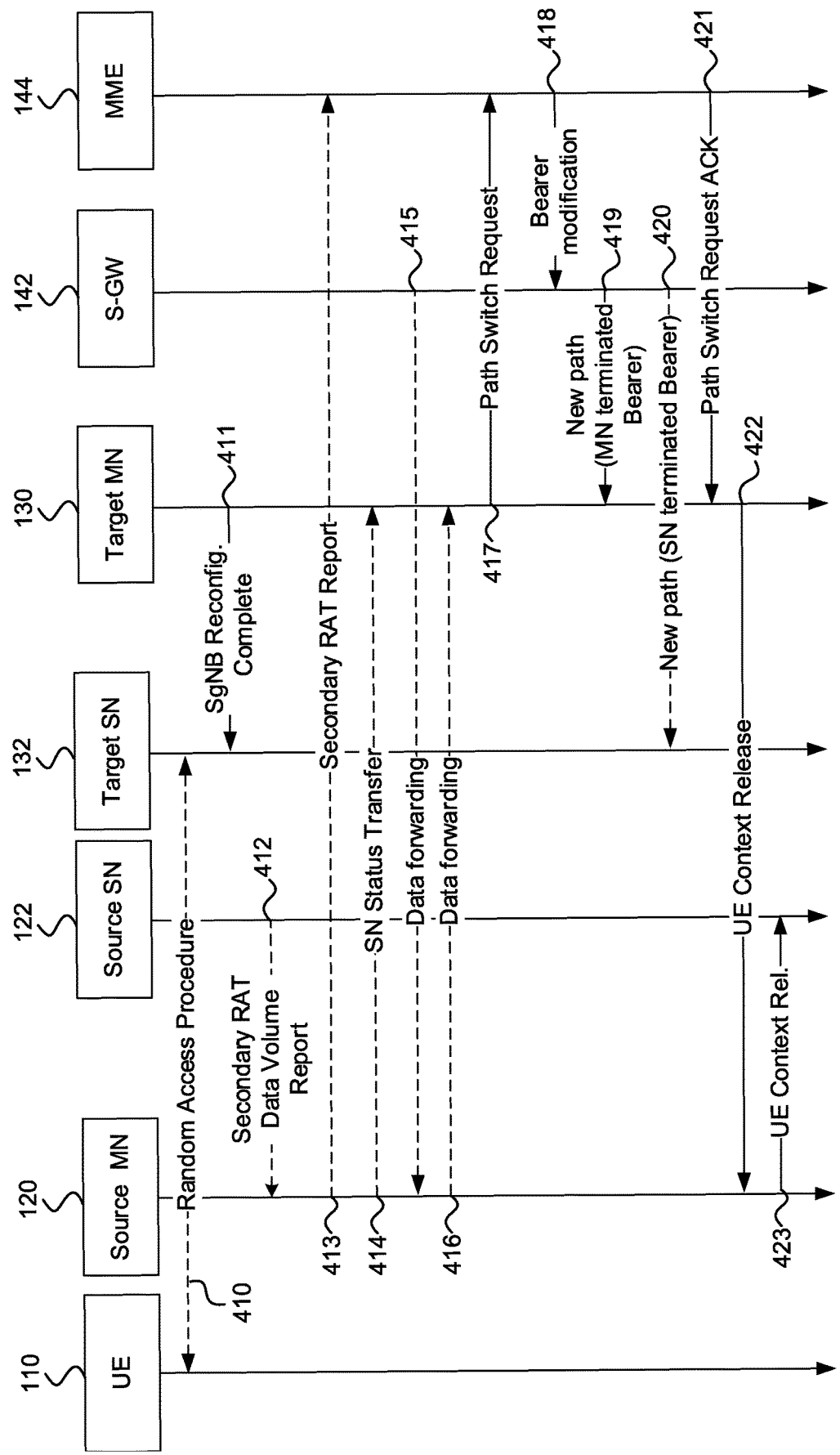

FIG. 4A and FIG. 4B illustrate an example of a handover procedure in a dual connectivity scenario, where source node 120 may comprise a source master node (MN) and where the target node 130 may comprise a target master node. UE 110 may initially establish connections to source MN 120 and source secondary node (SN) 122. Similar to operations 301 to 303 of FIG. 3, the source MN 120 may configure UE 110 to provide measurement reports associated with the source MN 120, the source SN 122, and/or one or more other base stations. Based on the received measurement reports, source MN 120 may determine to request handover to target MN 130.

At 401, the source MN 120 may transmit a handover request to the target MN 130. In response to receiving the handover request, the target MN 130 may determine whether to add the target SN 132 to maintain dual connectivity after the handover. If the target MN 130 determines to add the target SN 132, the target MN 130 may initiate a secondary node addition procedure, for example with the same X2-AP-ID that was already used with the source MN 120. An X2-AP-ID may identify UE 110 during handover. At 402, target MN 130 may transmit a secondary node addition request, for example an SgNB Addition Request, to the target SN 132. The target SN 132 may acknowledge reception of this message by sending a secondary node addition request acknowledgement message, for example a SgNB Addition Request Ack message, at 403. At 404, target MN 130 may transmit a handover request acknowledgement message, for example in response to receiving the secondary node addition request acknowledgement message from the target SN 132.

At 405, the source MN 120 may transmit a secondary node release request, for example an SgNB Release Request message, to the source SN 122. In response to receiving the secondary node release request message, the source SN 122 may terminate transmissions to UE 110. At 406, the source SN 122 may transmit a secondary node release request acknowledgement message, for example a SgNB Release Request Ack message.

At 407, the source MN 120 may transmit an RRC connection reconfiguration message to UE 110. The RRC connection reconfiguration message may comprise a handover command. In response to receiving the handover command, UE 110 may execute the handover to the target MN 130. UE 110 may for example initiate a random access procedure 408 between UE 110 and target MN 130 to request connection to target MN 130. At 409, the UE 110 may transmit an RRC connection reconfiguration complete message to target MN 130.

Continuing the procedure with reference to FIG. 4B, the UE 110 may further synchronize with the target SN 132 to maintain dual connectivity, for example in response to receiving a message that indicates a secondary node or secondary cell group configuration. UE 110 may initiate a random access procedure 410 between the UE 110 and target SN 132. In general, UE 110 may be configured to select a connectivity configuration to be applied after handover, for example based on multiple conditional handover connectivity options provided by target MN 130 and one or more conditions configured at UE 110 or received from the source MN 120.

At 411, the target MN 130 may transmit a secondary node reconfiguration complete message, for example a SgNB Reconfiguration Complete message, to the target SN 132. This message may indicate that the UE 110 has successfully completed the reconfiguration procedure. At 412, the source SN 122 may transmit a secondary node data volume report, for example a Secondary RAT (Radio Access Technology) Data Volume Report. This report message may for example indicate uplink and downlink data volumes of used secondary node resources. At 413, the source MN 120 may forward this information to MME 144, or AMF, for example in a Secondary RAT Report message.

At 414, the source MN 120 may transmit a sequential number (SN) status transfer message to the target MN 130. At 416, the source MN 120 may forward data packets provided by S-GW 142 at 415 to the target MN 130. At 417, target MN 130 may transmit a request for path switch to MME 144. A transfer path may refer to a path to which the core network delivers the data to be delivered to a particular UE. For example, the path switch may comprise switching transfer path of the UE's 110 data from the source MN 120 and source SN 122 to the target MN 130 and target SN 132. After the path switch, the target MN 130 and target SN 132 may communicate with the core network to obtain data to be transmitted to UE 110. The path switch procedure may comprise MME 144 transmitting a bearer modification message by MME 144 at 418, and initiating to provide data over the new paths to target MN 130 and target SN 132, at 419 and 420 respectively. Completion of the path switch request may be indicated by MME 144 by a path switch request acknowledgement message at 421.

At 422, the target MN 130 may transmit a UE context release message. At 423, the source MN 120 may forward the UE context release message to the source SN 122. In response to receiving the UE context release message from the target MN 130, the source SN 122 may release radio resources associated with UE 110.

As discussed above, the conditional handover procedure enables to provide a handover command early and thereby to improve reliability of the handover. However, in a dual connectivity scenario the radio conditions between the UE 110 and the source SN 122 may change before execution of the handover, for example between transmission of the conditional handover command by source MN 120 and triggering the conditional handover execution at UE 110. For example, connection to the source SN 122 may be lost or degraded and therefore it may not be desired to configure the UE 110 to use the same secondary node (source SN 122) after the handover. In this example it may be preferred to configure the UE 110 to apply a single connection to target MN 130, or to configure the UE to connect to a new secondary node, for example target SN 132, to maintain dual connectivity after handover.

However, if the source SN 122 is still active at the time of executing the handover, it may be desirable to configure UE 110 to use the same secondary node after handover in addition to the target MN 130. This enables to avoid service interruption, because the connection to the source SN 122 may be maintained throughout the handover procedure. Furthermore, this may reduce operational load caused by the handover, for example because there's no need to transfer the path to the secondary node or to release the secondary node. However, since the future status of the source SN 122 may not be known to the target MN 130 at the time of handover request, it may not be possible for the target MN 130 to select an optimal conditional handover connectivity configuration for UE 110. Some example embodiments are related to providing conditional handover signaling that enables a dual connectivity device to select between different conditional handover connectivity configurations at the time of conditional handover execution depending on the secondary node or secondary cell group status.

Figure 5:
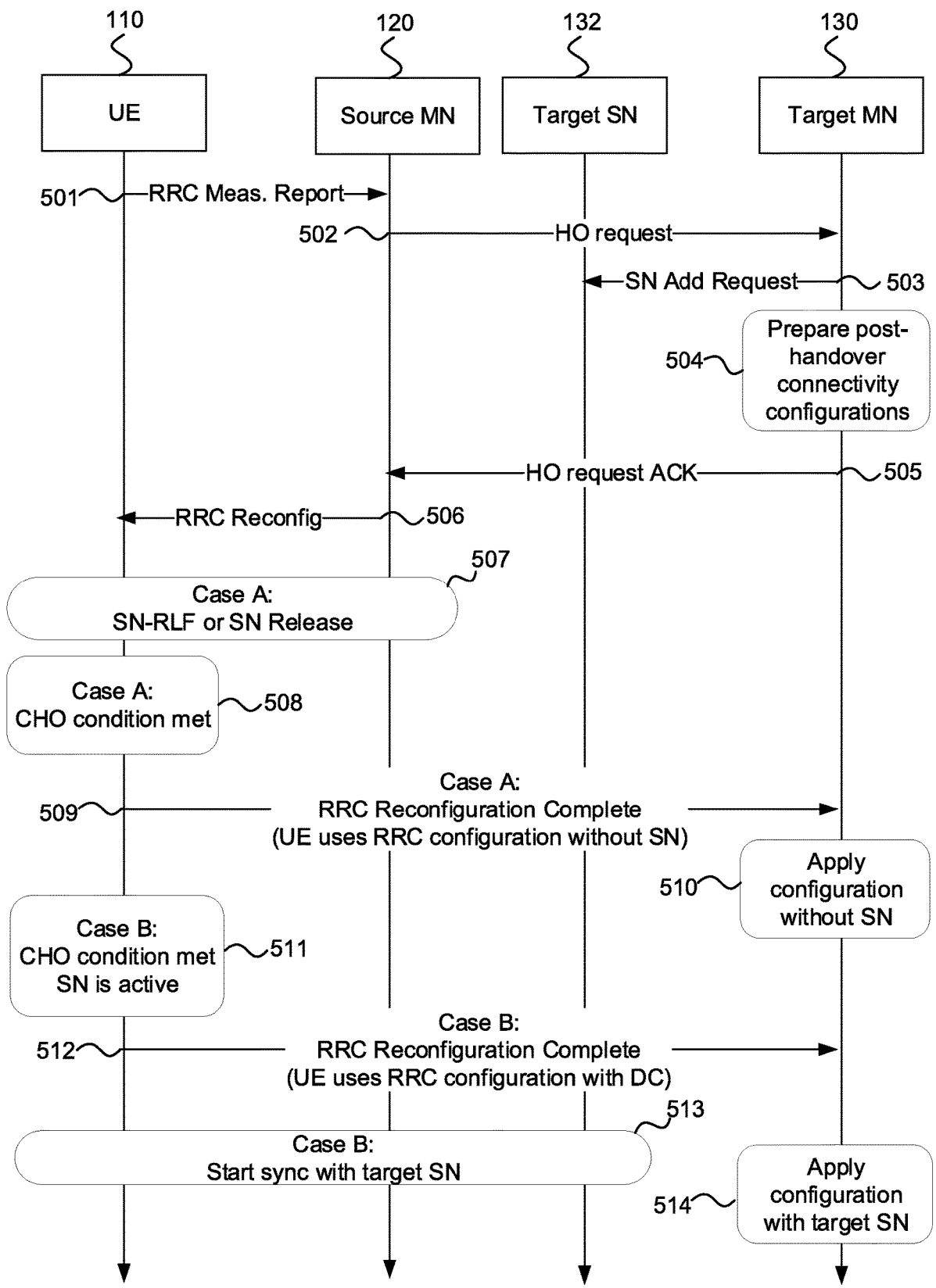
FIG. 5 illustrates an example of a conditional handover procedure with different conditional handover connectivity configurations, according to an example embodiment.

FIG. 5 illustrates an example of a conditional handover procedure with different conditional handover connectivity configurations, according to an example embodiment. Example embodiments of FIG. 5 may be combined with the above example embodiments, for example the dual connectivity handover examples of FIG. 4A and FIG. 4B. the Initially, UE 110 may establish a first connection to the source MN 120 and a second connection to the source SN 122 (not shown in FIG. 5). At 501, UE 110 may be configured to send a handover measurement report, for example an RRC Measurement Report message, to source MN 120, to similar to the handover procedures of FIG. 3, FIG. 4A, and FIG. 4B.

At 502, the source MN 120 may determine to perform handover and transmit a handover request to the target MN 130. The handover request may comprise an identifier of the target MN 130, identifier(s) of one or more target cells, and/or an indication of the source SN 122 associated with UE 110. The handover request may comprise a handover type indicating conditional handover. The handover type may be indicated by a value of a signaling field, for example a set of bits, in the handover request message or a separate handover type indication message. Handover type may be indicated this way also in other type of messages, for example messages sent to UE 110. The handover request may comprise information about the source SN 122, for example one or more measurement results associated with the source SN 122. The measurement results may be provided to the source MN 120 by UE 110. The measurement results may be transmitted to target MN 130 for example as part of UE context information in the handover request message, or a separate message. The target MN 130 may receive the handover request message(s) from the source MN 120.

According to an example embodiment, the source MN 120 may be configured to transmit, to the target master node 130, an indication of the source MN 120 supporting delivery of the plurality of conditional handover configurations to the UE 110. This indication may be included in the handover request, or a separate message. In response to receiving this indication, the target MN may determine to prepare and provide the plurality of conditional handover connectivity options. In some example embodiments, the target MN 130 may be configured to prepare a single connectivity configuration without a dual connectivity configuration, in response to not receiving such indication. According to an example embodiment, target MN 130 may be configured to provide a single conditional handover connectivity configuration or a plurality of conditional handover connectivity as a default configuration, if no indication of the source MN 120 supporting delivery of two or more conditional handover conditions is received.

At 503, the target MN 130 may send a secondary node addition request to at least one target secondary node 132, for example in response to receiving the handover request and the indication of conditional handover type. Even though FIG. 5 illustrates only one target secondary node, target SN 132, it is understood that similar operations and communications may be applied at, or with respect to, source SN 122 or alternative SN 134, when applying a conditional handover configuration including the source SN 122 and/or the alternative SN 134, for example as described in relation to FIG. 8 or FIG. 10.

At 504, the target MN 130 may determine to prepare a plurality of conditional handover connectivity configurations, for example in response to receiving the handover request and/or the indication of conditional handover type. The target node may determine whether to prepare resources with target MN 130 only or with target MN 130 and a secondary node, for example based on resource conditions at the target MN 130 and/or the indication of the secondary node included in the handover request. For example, target MN 130 may determine to prepare resources with target MN 130 and the secondary node if the target MN 130 is not able to allocate all needed resources for the completing handover request. The target MN 130 may also prepare two configurations comprising target MN 130 only and target MN 130 with a secondary node if earlier mobility performance or other information at the target MN 130 indicates possibility of loss of secondary cell group during the handover. For example, if one or more previous dual connectivity handovers failed because of losing connection to the secondary node, the target MN 130 may determine to include the single connectivity option in the conditional handover connectivity configurations. The target MN 130 may then prepare the plurality of conditional handover connectivity configurations for the UE 110.

At 505, the target MN 130 may transmit an indication of the plurality of conditional handover connectivity configurations to the source MN 120. The target MN 130 may further transmit an indication of at least one condition for selecting a particular conditional handover connectivity configuration from the plurality of conditional handover connectivity configurations upon triggering the conditional handover at UE 110. This enables target MN 130 to control selection of the conditional handover connectivity configuration at UE 110 in various situations. The indication(s) may be included in a handover request acknowledgement message, which may be transmitted in response to receiving the handover request. Each conditional handover connectivity configuration may be associated with an indication of whether the configuration is to be selected when the source SN 122 is active or non-active. In general, each conditional handover connectivity configuration may be associated with at least one condition for selecting that configuration. Indication(s) of the conditional handover connectivity configurations may be transmitted in a single message or a plurality of messages, for example in two separate messages. The source MN 120 may receive the indication(s) of the conditional handover configurations for UE 110 and the condition(s) associated therewith.

According to an example embodiment, the plurality of conditional handover connectivity configurations may comprise a single connectivity configuration and a dual connectivity configuration. The single connectivity configuration may be with the target MN 130. The dual connectivity configuration may be with the target MN 130 and a target secondary node. Alternatively, or additionally, the dual connectivity configuration may be with the target master node and the source secondary node.

Figure 6:
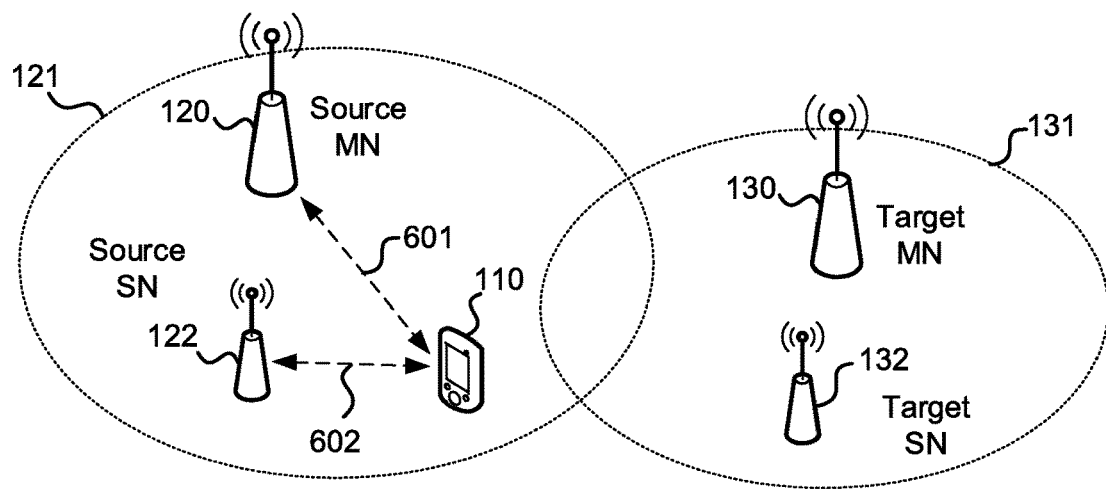
FIG. 6 illustrates a client node communicating with a source master node and a source secondary node, according to an example embodiment.

FIG. 6 illustrates an example of UE 110 initially communicating with a source MN 120 and a source SN 122 over radio links 601 and 602, respectively. UE 110 may move towards coverage area 131 of the target MN 130 and may send one or more measurement reports associated with source MN 120, source SN 122, and one or more other network nodes such as target MN 130 and target SN 132 to source MN 120. When moving to coverage area 131 of the target MN 130, the UE 110 may be handed over from the source MN 120 to the target MN 130.

Figure 7:
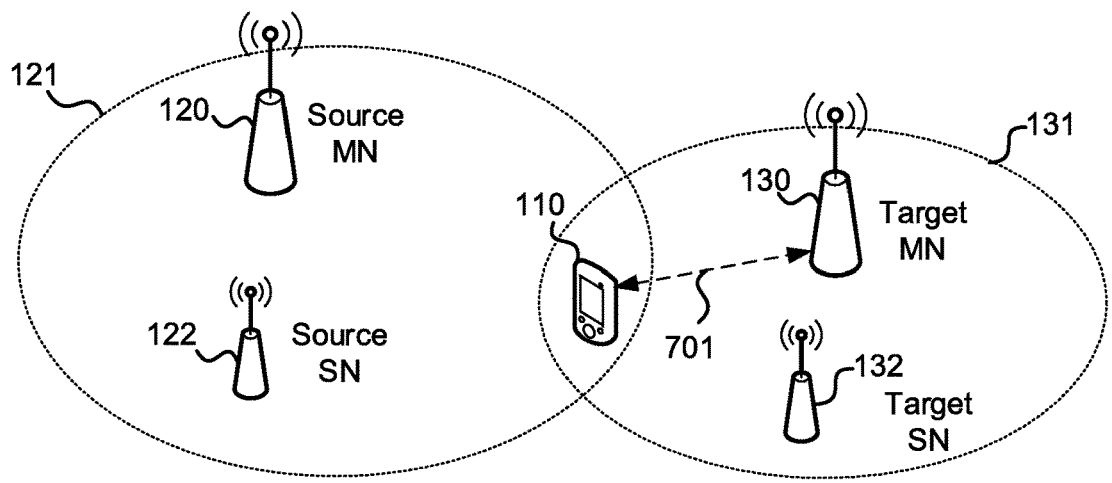
FIG. 7 illustrates a client node communicating with a target master node, according to an example embodiment.

FIG. 7 illustrates an example of a single connectivity configuration after the handover. UE 110 may communicate with the target MN 130 over radio link 701. Such configuration may be applied for example if the radio link 602 to the source SN 122 is released, lost, or degraded before execution of the handover.

Figure 8:
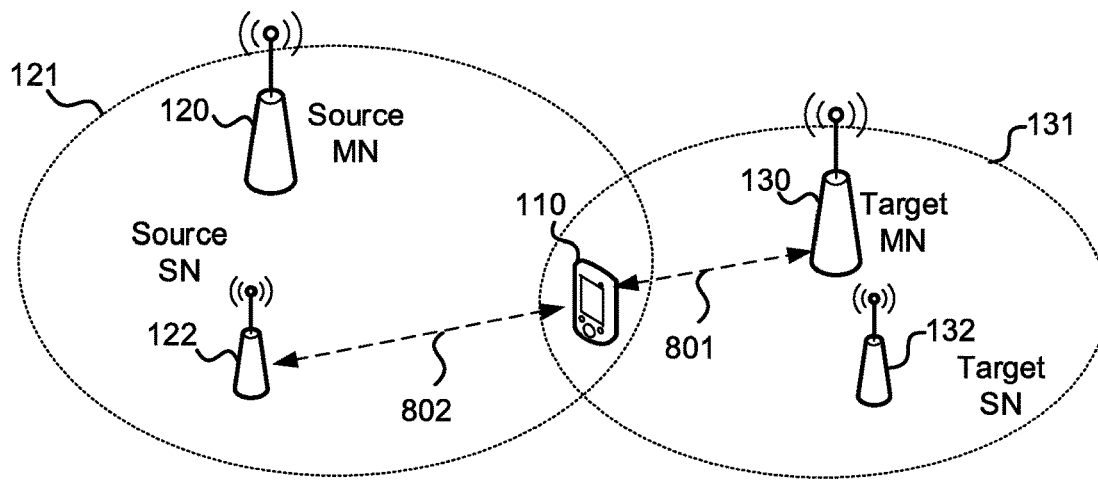
FIG. 8 illustrates a client node communicating with a target master node and a source secondary node, according to an example embodiment.

FIG. 8 illustrates an example of a dual connectivity configuration after handover. UE 110 may communicate with target MN 130 and the source secondary node, source SN 122. Communications to the target MN 130 and source SN 122 may be provided over radio links 801 and 802, respectively. This configuration enables to maintain dual connectivity after handover. This configuration may be applied for example if the radio link 602 to the source SN 122 is still active at the time of executing the handover. This configuration also enables to maintain connectivity to source SN 122 throughout the handover, thereby reducing the risk of service interruption.

Figure 9:
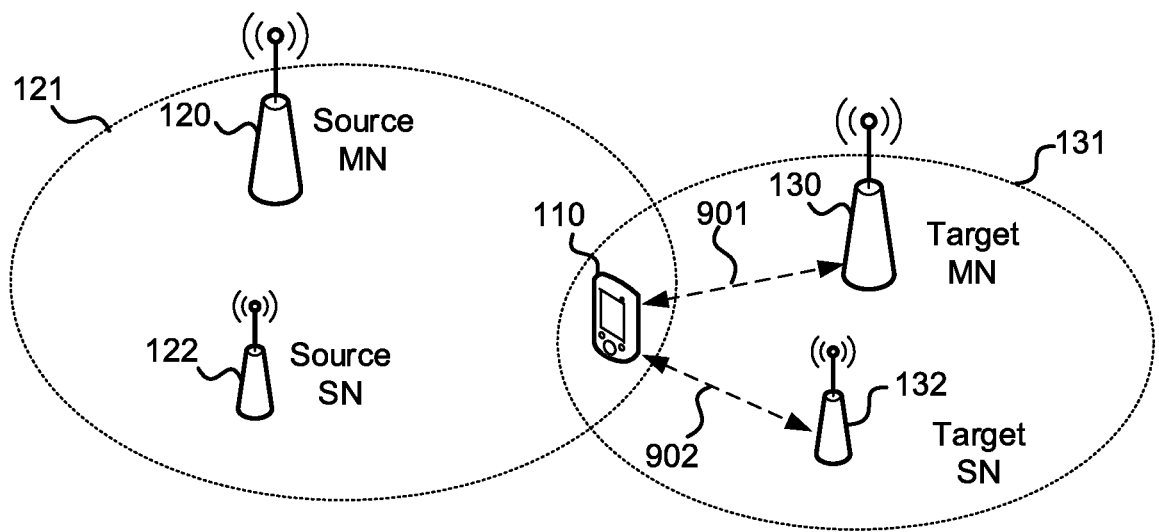
FIG. 9 illustrates a client node communicating with a target master node and a target secondary node, according to an example embodiment.

FIG. 9 illustrates another example of a dual connectivity configuration after the handover. UE 110 may communicate with target MN 130 and a target SN 132 over radio links 901 and 902, respectively. The target SN 132 may be different from the source SN 122. This configuration enables to maintain dual connectivity after handover. This configuration may be applied for example if the radio link 602 to the source SN 122 is released, lost, or degraded before execution of the conditional handover and there's a new secondary node available. Availability of the new secondary node may be determined by target MN 130, for example based on measurement results sent by UE 110 and forwarded to target MN 130 by source MN 120.

Figure 10:
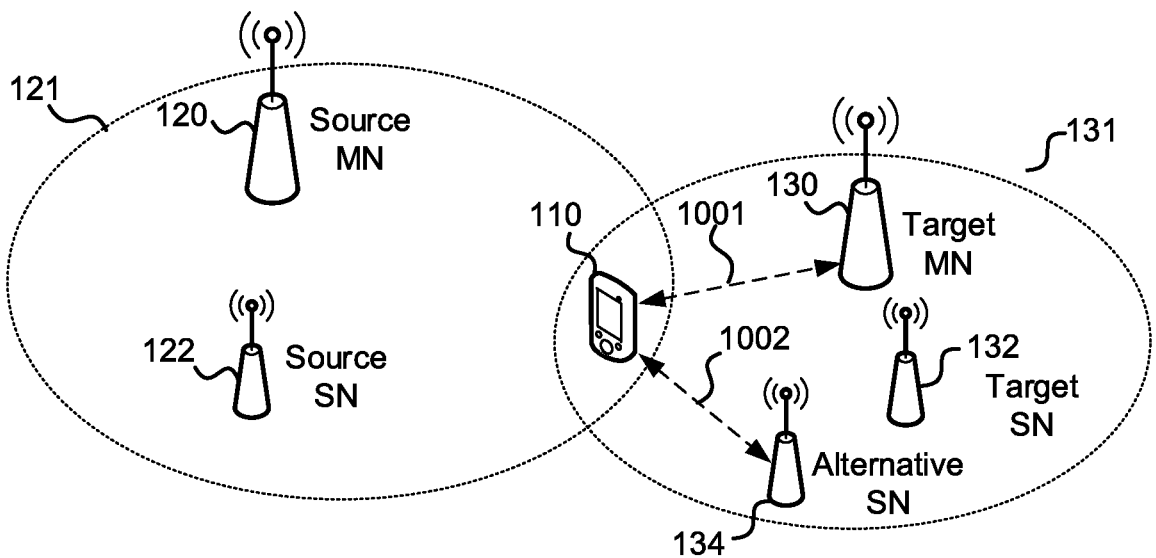
FIG. 10 illustrates a client node communicating with a target master node and an alternative secondary node, according to an example embodiment.

FIG. 10 illustrates another example of a dual connectivity configuration after handover. According to an example embodiment, the plurality of conditional handover connectivity configurations may comprise a first dual connectivity configuration with the target MN 130 and the source SN 122. The plurality of conditional handover connectivity configurations may further comprise a second dual connectivity configuration with the target MN 130 and the target SN 132. The plurality of conditional handover configurations may further comprise the single connectivity configuration with the target MN 130. Based on at least one condition at the time of triggering the conditional handover, the UE 100 may select one of the configurations for execution of the conditional handover. When selecting the alternative SN 134 as the secondary node, UE 110 may communicate with target MN 130 and the alternative SN 134 over radio links 1001 and 1002, respectively. This enables to provide multiple secondary node options and thereby increases the probability of finding an available secondary node to maintain dual connectivity after handover.

According to an example embodiment, example, the plurality of conditional handover connectivity configurations may comprise a first dual connectivity configuration with target MN 130 and target SN 132 and a second dual connectivity configuration with target MN 130 and the source SN 122. This provides an opportunity to maintain dual connectivity without service interruption by means of source SN 122, while providing an option to access a new secondary node (target SN 132) to maintain dual connectivity if the radio link to the source SN 122 is released, lost, or degraded.

According to an example embodiment, the at least one condition for selecting a conditional handover configuration may comprise detecting or not detecting a secondary node change from the source SN 122 to the target SN 132, or the alternative SN 134, before triggering execution of the conditional handover. For example, UE 110 may be configured to select the first dual connectivity configuration, comprising connections with the target MN 130 and source SN 122, in response to not detecting the secondary node change prior to triggering of the execution of the conditional handover. The UE 110 may be further configured to select the second configuration comprising connections with the target MN 130 and target SN 132, in response to not detecting the secondary node change prior to triggering of the execution of the conditional handover. If both the target SN 132 and the alternative SN 134 are included in the plurality of conditional handover configurations, the UE may select the secondary node based on measurement results, a priority order of secondary nodes, or other predetermined criteria.

Referring back to FIG. 5, the at least one condition for selecting a particular conditional handover connectivity configuration from the plurality of conditional handover connectivity configurations, sent at 505, may comprise an active status or a non-active status of the source SN 122. For example, if the source SN 122 is active at the time of executing the conditional handover, the UE 110 may be instructed to select a dual connectivity option where the source SN 122 remains as the secondary node. If the source SN 122 is non-active, the UE 110 may be instructed to select a single connectivity configuration with target MN 130 or a dual connectivity option with the target MN 130 and another secondary node.

A non-active status of the source SN 122 may refer to a situation where UE 110 has lost connection to the source SN 122 or where no application data is communicated between UE 110 and source SN 122. An active status of the source SN 122 may refer to a situation where UE 110 is connected to source SN 122 such that application data may be communicated between the devices. UE 110 may for example determine the source SN 122, or the source secondary cell group, to have an active status if the UE 110 is in an RRC_CONNECTED state with the source SN 122. UE 110 may determine the source SN 122 to have a non-active status for example if the UE 110 is not in an RRC_CONNECTED state with the source SN 122.

According to an example embodiment, the at least one condition for selecting a particular conditional handover connectivity configuration from the plurality of conditional handover connectivity configurations may comprise detecting a release of the source SN 122. For example, if the source SN 122 has been released, the UE 110 may determine the status of the source SN 122 to be non-active. The at least one condition may further comprise detecting a signal strength or signal quality associated with the source SN 122 to be or decrease below or equal to a threshold. For example, if UE 110 determines that signal strength or quality is no longer sufficient, the UE 110 may determine to regard the connection to source SN 122 as non-active, when selecting one of the conditional handover connectivity configurations. The at least one condition may further comprise detecting one or more out-of-sync indications associated with the source SN 122, for example one or more out-of-sync indications generated at UE 110. The at least one condition may further comprise detecting initiation of a radio link monitoring (RLM) timer associated with the source SN 122. The radio link monitoring timer may for example comprise a T313 timer in accordance with 3GPP specifications. Applying one or more of these conditions enable to avoid performing a dual connectivity handover with maintaining the same source SN 122 when the connection to the source SN 122 is lost, expected to be lost or degraded to an insufficient level.

The at least one condition may further comprise detecting a radio link failure associated with the source SN 122 or detecting a beam failure associated with the source SN 122. UE 110 may determine a radio link failure to have occurred for example if it is not able to maintain synchronization with source SN 122, if reference signal received power (RSRP) is or decreases below a threshold, or if UE 110 is not able to decode a particular channel, for example a physical downlink control channel (PDCCH) or a physical downlink service channel (PDSCH). A beam failure may be detected based on similar criteria, but being associated with a particular beam. In response to detecting the at least one condition, the UE 110 may be configured to select the single connectivity configuration or a dual connectivity configuration without the source SN 122.

At 506, the source MN 120 may transmit the indication of the plurality of conditional handover connectivity configurations to UE 110. The source MN 120 may further transmit the indication of at least one condition for selecting a conditional handover connectivity configuration to UE 110. The source MN 120 may further transmit an indication of at least one condition for triggering execution of the conditional handover to UE 110. The source MN 120 may also transmit an indication of a handover type to UE 110. The handover type may indicate a conditional handover. The conditional handover connectivity configurations, the condition(s) for selecting such configuration, the handover execution condition, and/or the handover type may be included in one or more control messages. RRC Reconfiguration message of FIG. 5 is an example of such control message. The control message(s) may comprise a handover command. UE 110 may receive the indication(s) from source MN 120.

According to an example embodiment, the condition for triggering the execution of the conditional handover may comprise detecting an A3 event. In accordance with 3GPP specifications, an A3 event may be detected for example if a neighbouring cell becomes an offset better than the current cell, for example in terms of signal strength. The condition(s) for triggering execution of the conditional handover may also include a non-active status of the source SN 122 or threshold(s) associated with radio conditions, for example signal strength or quality, between the UE 110 and the source SN 122.

FIG. 5 illustrates a first example, Case A, where conditional handover is executed after detecting source SN 122 to be non-active, for example based on a radio link failure or release of the source SN 122. Operations associated with to Case A may be however applied also when degradation of the radio link with the source SN 122 is detected, for example based on one or more of the conditions associated with the connection to the source SN 122. For example, UE 110 may be configured to determine that status of the source SN 122, or status of the connection to the source SN 122, is non-active based on a detecting one or more of the following conditions: a release of the source SN 122, detecting a signal strength or signal quality associated with the source SN 122 to be or decrease below or equal to a threshold, detecting one or more out-of-sync indications associated with the source SN 122, detecting initiation of a radio link monitoring (RLM) timer associated with the source SN 122, detecting a radio link failure associated with the SN 122, or detecting a beam failure associated with the source SN 122. In response to determining that the source SN 122 is non-active, or detecting at least one of the conditions, the UE 110 may select the single connectivity configuration, or a dual connectivity configuration not involving the source SN 122.

According to an example embodiment, source MN 120 may determine that status of the source SN 122 is non-active with respect to UE 110, for example based on an indication of the non-active status received from source SN 122 or UE 110. Source MN 120 may transmit an indication of the non-active status of the source SN 122 to target MN 130. In response to determining that status of the source SN 122 is non-active, for example based on the indication received from source MN 120, the target MN 130 may transmit a secondary node release request to the target SN 132. This enables releasing unnecessary resources prepared for a dual connectivity configuration.

For example, at 507 UE 110 and/or source MN 120 may detect a radio link failure associated with the source SN 122 or a release of the source SN 122. The source MN 120 may transmit an indication of the release or the radio link failure to the target MN 130. Therefore, the target MN 130 and UE 110 may be both aware of the non-active status of the source SN 122. This enables target MN 130 to execute handover of UE 110 with the conditional handover connectivity configuration selected by UE 110 at the time of executing the handover. Therefore, explicit signaling of the selected conditional handover connectivity configuration from the UE 110 to the target MN 130 may be avoided, which reduces the required capacity at the air interface between UE 110 and target MN 130. Furthermore, since the single connectivity configuration was already prepared and indicated to UE 110, the target MN 130 does not need to send explicit reconfiguration to reflect the removal of the secondary node, or SCG, in the target configuration, since the alternative not involving the source SN 122 may have been already provided in the conditional handover command itself, at 506. Therefore, further RRC reconfiguration messages towards UE 110 for modification of conditional handover preparation information can be avoided.

At 508, the UE 110 may detect triggering of execution of the conditional handover, for example based on detecting that the handover execution condition is met. In response to detecting triggering of the conditional handover, the UE 110 may select a conditional handover connectivity configuration from the plurality of conditional handover connectivity configurations based on at least one condition associated with the connection to the source SN 122. The UE 110 may determine which of the conditional handover connectivity configurations to select for executing the triggered conditional handover based on the status of the connection to the source SN 122. For example, UE 110 may select the single connectivity configuration in response to determining that the status of the source secondary node is non-active. Alternatively, UE 110 may select a dual connectivity configuration not involving the source SN 122, if such option is provided in the plurality of conditional handover connectivity configurations.

At 509, UE 110 may initiate handover access to the target MN 130, for example by sending a connection request to target MN 130. The connection request may comprise one or more control messages such as for example an RRC reconfiguration complete message. The control messages may comprise a handover complete message, which may be included in the RRC reconfiguration complete message. UE 110 may use the single connectivity configuration without any secondary node. At 510, the target MN may apply the single connectivity configuration without any secondary node.

In the example of Case A, the source SN 122 is released or a radio link failure is detected. Based on this information the UE 110 may select a single connectivity configuration with target MN 130. The UE 110 may execute the conditional handover based on the single connectivity configuration. In response to reception of the connection request, the target MN 130 may execute the conditional handover based on the single connectivity configuration. The target MN 130 may select the conditional handover configuration to be applied for example based on information regarding the source SN 122, which may be received from source MN 120. For example, if the target MN 130 receives an indication of the non-active status of the source SN 122, the target MN 130 may execute the conditional handover based on the single connectivity configuration.

FIG. 5 further illustrates a second example, Case B, where conditional handover is executed while the source SN 122, or source secondary cell group, is active with respect to UE 110. At 511, the UE 110 may detect triggering of the conditional handover, for example based on determining that the handover execution condition is met. In response to triggering of the conditional handover, the UE 110 may determine the status of the source SN 122, for example that the source SN 122 is active, and/or whether the one or more conditions associated with selection of the conditional handover connectivity configurations are met. According to an example embodiment source MN 120 may determine whether source SN 122 is active with respect to UE 110 based on an indication of the active status received from source SN 122 or UE 110. Source MN 120 may transmit an indication of the active status of the source SN 122 to target MN 130. Therefore, the target MN 130 and UE 110 may be both aware of the active status of the source SN 122. Alternatively, target MN 130 may determine the source SN 122 to have an active status if no indication of a non-active status is received from source MN 120.

At 511, the UE 110 may further determine which of the conditional handover connectivity configurations to select for executing the triggered conditional handover. In the example Case B, the source SN 122 is still active. In response to determining that the status of the source SN 122 is active, UE 110 may select a dual connectivity configuration. For example, the UE 110 may select a dual connectivity configuration with the target MN 130 and the source SN 122. Alternatively, UE 110 may select a dual connectivity configuration with the target MN 130 and a new target SN 132, or a dual connectivity configuration with the target MN 130 and an alternative SN 134, which may be provided as an option in addition to the target SN 132.

Selecting the target secondary node may be based on one or more criteria associated with radio link conditions between UE 110 and the secondary nodes in question, for example signal strength and/or quality. According to an example embodiment, the criteria for selecting between multiple secondary nodes may be known both to UE 110 and target MN 130, and therefore UE 110 may not need to inform target MN 130 of the selection. However, UE 110 may also send an indication of the selected conditional handover connectivity configuration to target MN 130, for example if there are multiple secondary nodes that meet the selection criteria.

UE 110 may initiate handover access to the target MN 130, for example by sending a connection request to target MN 130 at 512. The connection request may comprise one or more control messages such as for example an RRC reconfiguration complete message. The control messages may comprise a handover complete message, which may be included in the RRC reconfiguration complete message. At 513, UE 110 may initiate handover access to the target SN 132 similar to the handover access with the target MN 130. UE 110 may synchronize to the target SN 132 simultaneously with synchronization to the target MN 130. The UE 110 may use the selected dual connectivity (DC) configuration.

Target MN 130 may receive an indication of the active status of the source SN 122 from the source MN 120. The target MN 130 may further receive the connection request from UE 110. At 514, the target MN 130 may execute the conditional handover based on the dual connectivity configuration, for example in response to reception of the connection request from UE 110 and the indication of the active status of source SN 122 received from source MN 120. For example, if the target MN 130 has a valid preparation for a dual connectivity configuration with the target MN 130 and the target SN 132, the target MN 130 may send an SN Reconfiguration Complete message to the target SN 132. This may be done to inform the target SN 132 of the execution of the conditional dual connectivity handover.

Example embodiments enable preparing for different connectivity options depending on the radio conditions at the time of triggering execution of a conditional handover. For example, if the target MN 130 estimates possible change of secondary node or a secondary cell group (SCG) at the time of conditional handover execution, the target MN 130 may prepare a plurality of configurations, for example with and without a secondary node, or SCG, as described above. If the secondary node was changed prior to conditional handover execution, the preparation at the target MN 130 need not be changed as the target MN 130 can apply the single connectivity configuration. The source MN 120 may inform the prepared target MN 130 as well to switch to the single connectivity configuration when the change of secondary node is applied on the source configuration.

As discussed above, the target MN 130 may prepare a plurality of dual connectivity configurations for selection upon execution of the conditional handover. A dual connectivity configuration with an alternative SN 134 may be prepared for example if the target MN 130 identifies potential new secondary node(s), or SCG(s), before execution of the conditional handover. The target MN 130 may for example provide two dual connectivity configurations: a first configuration with the current secondary node, for example source SN 122, and a second configuration one with a new secondary node, for example target SN 132 or alternative SN 134. RRC signalling towards UE 110 may include an indication of the secondary nodes along with a conditional handover execution condition, for example in-terms of an A3 event comparing master cell group with the new secondary cell group associated with the new secondary node. In response to determining that conditional handover execution condition is met, the UE 110 may check the secondary node. If the secondary node was not changed, UE 110 may apply the first configuration. If the secondary node was changed and matches with the secondary node indicated along with the conditional handover execution condition, the UE 110 may apply the second configuration.

Various example embodiments disclose methods, computer programs and apparatuses for applying sidelink communication to enable a seamless handover, to avoid service interruption during handover, and to increase communication reliability during handover.

Figure 11:
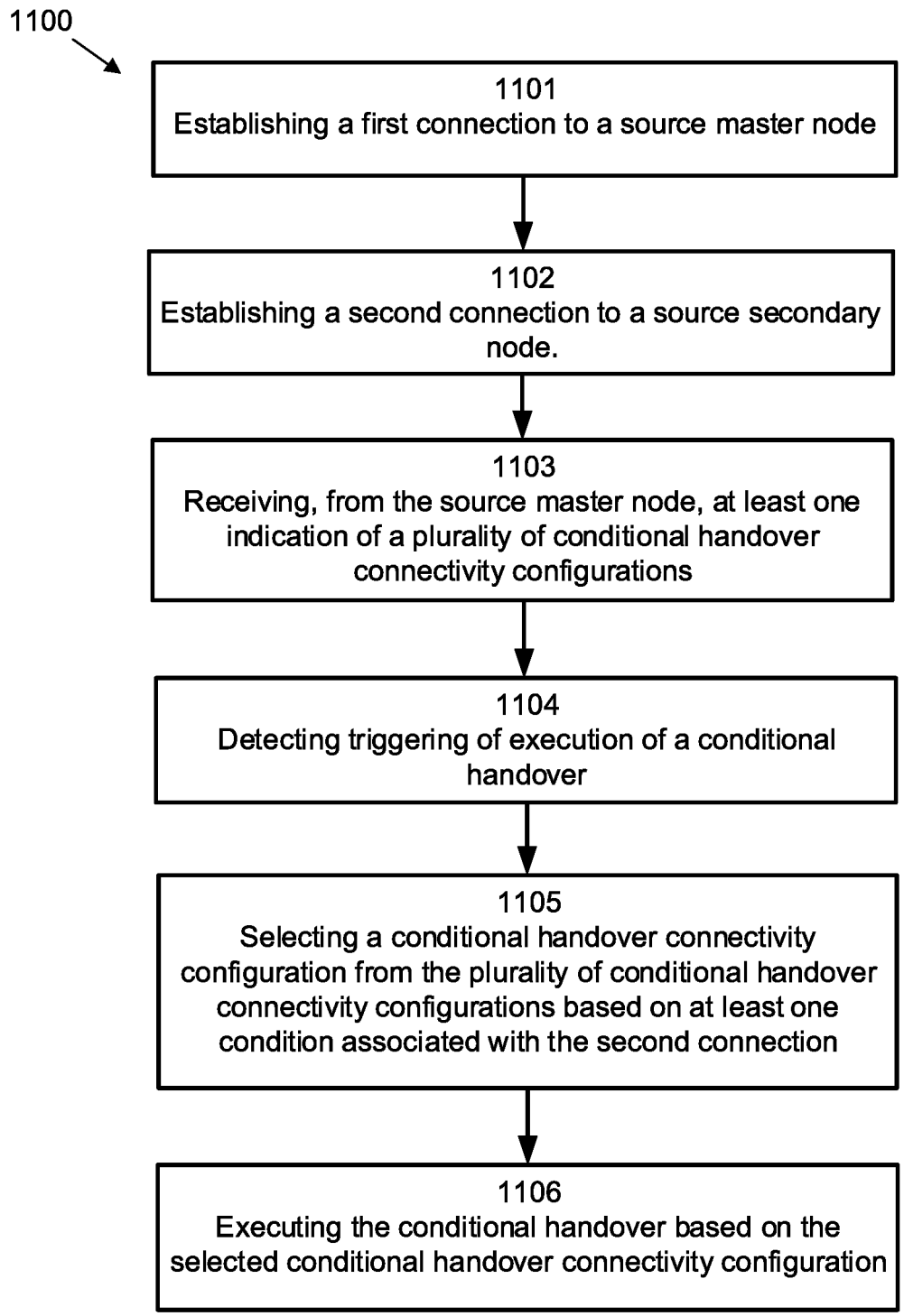
FIG. 11 illustrates an example of a method for performing a handover at a client node, according to an example embodiment.

FIG. 11 illustrates an example of a method 1100 for performing handover at a client node, according to an example embodiment.

At 1101, the method may comprise establishing a first connection to a source master node.

At 1102, the method may comprise establishing a second connection to a source secondary node.

At 1103, the method may comprise receiving, from the source master node, at least one indication of a plurality of conditional handover connectivity configurations.

At 1104, the method may comprise detecting triggering of execution of a conditional handover.

At 1105, the method may comprise selecting a conditional handover connectivity configuration from the plurality of conditional handover connectivity configurations based on at least one condition associated with the second connection.

At 1106, the method may comprise executing the conditional handover based on the selected conditional handover connectivity configuration.

According to an example embodiment, the plurality of conditional handover connectivity configurations may comprise: a single connectivity configuration with a target master node, and a dual connectivity configuration with the target master node and the source secondary node. The at least one condition associated with the second connection may comprise an active status or a non-active status of the source secondary node.

The method may further comprise selecting the single connectivity configuration in response to determining that the status of the source secondary node is non-active and/or or selecting the dual connectivity configuration in response to determining that the status of the source secondary node is active. The at least one condition associated with the second connection may comprises at least one of: detecting a release of the source secondary node, detecting a signal strength or signal quality associated with the source secondary node to be below or equal to a threshold, detecting one or more out-of-sync indications associated with the source secondary node, detecting initiation of a radio link monitoring timer associated with the source secondary node, detecting a radio link failure associated with the source secondary node, or detecting a beam failure associated with the source secondary node. The method may further comprise selecting the single connectivity configuration in response to detecting the at least one condition.

According to an example embodiment, the plurality of conditional handover connectivity configurations may comprise at least two of: a first dual connectivity configuration with the target master node and the source secondary node; a second dual connectivity configuration with the target master node and the target secondary node; and the single connectivity configuration with the target master node. The method may further comprise selecting the first dual connectivity configuration in response to not detecting a secondary node change from the source secondary node to the target secondary node prior to the triggering of the execution of the conditional handover, and/or selecting the second dual connectivity configuration in response to detecting the secondary node change prior to the triggering of the execution of the conditional handover.

Figure 12:
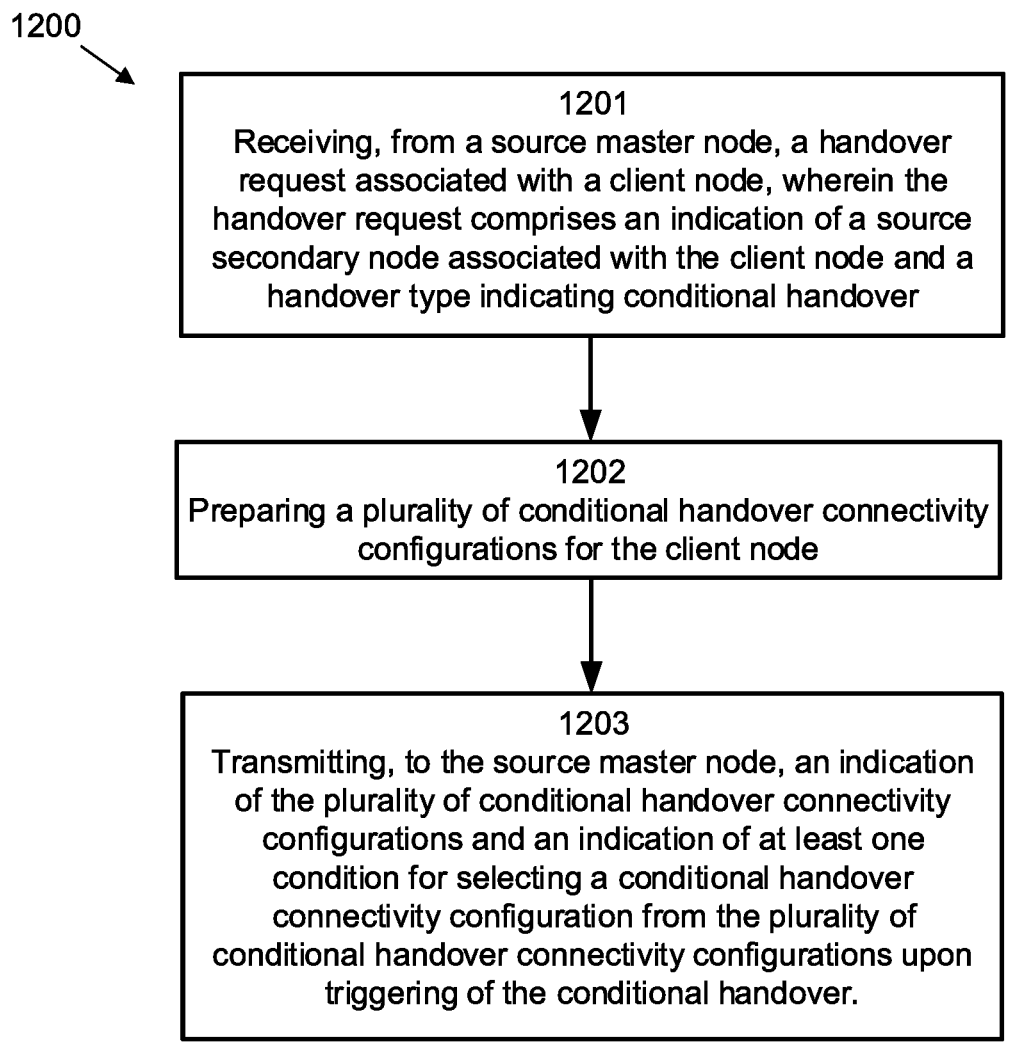
FIG. 12 illustrates an example of a method for performing handover at a network node, according to an example embodiment.

According to an example embodiment, the method may further comprise receiving, from the source master node, at least one control message comprising at least one of: the indication of the plurality of conditional handover connectivity configurations; the at least one condition associated with the second connection for selecting the conditional handover connectivity configuration; or at least one second condition for triggering the execution of the conditional handover. The at least one second condition for triggering the execution of the conditional handover may comprise an A3 event. The at least one control message may comprise a handover type indicating conditional handover. The at least one control message comprises a radio resource control connection reconfiguration message. The radio resource control connection reconfiguration message may comprise a handover command message FIG. 12 illustrates an example of a method 1200 for performing handover at a network node, for example target master node 130, according to an example embodiment.

At 1201, the method may comprise receiving, from a source master node, a handover request associated with a client node. The handover request may comprise an indication of a source secondary node associated with the client node and a handover type indicating conditional handover.

At 1202, the method may comprise preparing a plurality of conditional handover connectivity configurations for the client node.

At 1203, the method may comprise transmitting, to the source master node, an indication of the plurality of conditional handover connectivity configurations and an indication of at least one condition for selecting a conditional handover connectivity configuration from the plurality of conditional handover connectivity configurations upon triggering of the conditional handover.

According to an example embodiment the plurality of conditional handover connectivity configurations may comprises: a single connectivity configuration with a target master node, and a dual connectivity configuration with the target master node and a target secondary node.

According to an example embodiment, the plurality of conditional handover connectivity configurations may comprise: a single connectivity configuration with a target master node, and a dual connectivity configuration with the target master node and the source secondary node. The at least one condition for selecting the conditional handover connectivity configuration may comprises an active status or a non-active status of the source secondary node. The at least one condition for selecting the conditional handover connectivity configuration comprises at least one of: detecting a release of the source secondary node, detecting a signal strength or signal quality associated with the source secondary node to be below or equal to a threshold, detecting one or more out-of-sync indications associated with the source secondary node, detecting initiation of a radio link monitoring timer associated with the source secondary node, detecting a radio link failure associated with the source secondary node, or detecting a beam failure associated with the source secondary node.

According to an example embodiment, the method may further comprise receiving, from the source master node, an indication of the active status of the source secondary node; receiving a connection request from the client node; and executing the conditional handover based on the dual connectivity configuration.

According to an example embodiment, the method may further comprise receiving, from the source master node, an indication of the non-active status of the source secondary node; receiving a connection request from the client node; and executing the conditional handover based on the single connectivity configuration.

According to an example embodiment, the method may further comprise transmitting a secondary node release request to the target secondary node, in response to receiving the indication of the non-active status of the source secondary node.

According to an example embodiment, the plurality of conditional handover connectivity configurations may comprise at least two of: a first dual connectivity configuration with the target master node and the source secondary node; a second dual connectivity configuration with the target master node and the target secondary node; and the single connectivity configuration with the target master node.

Figure 13:
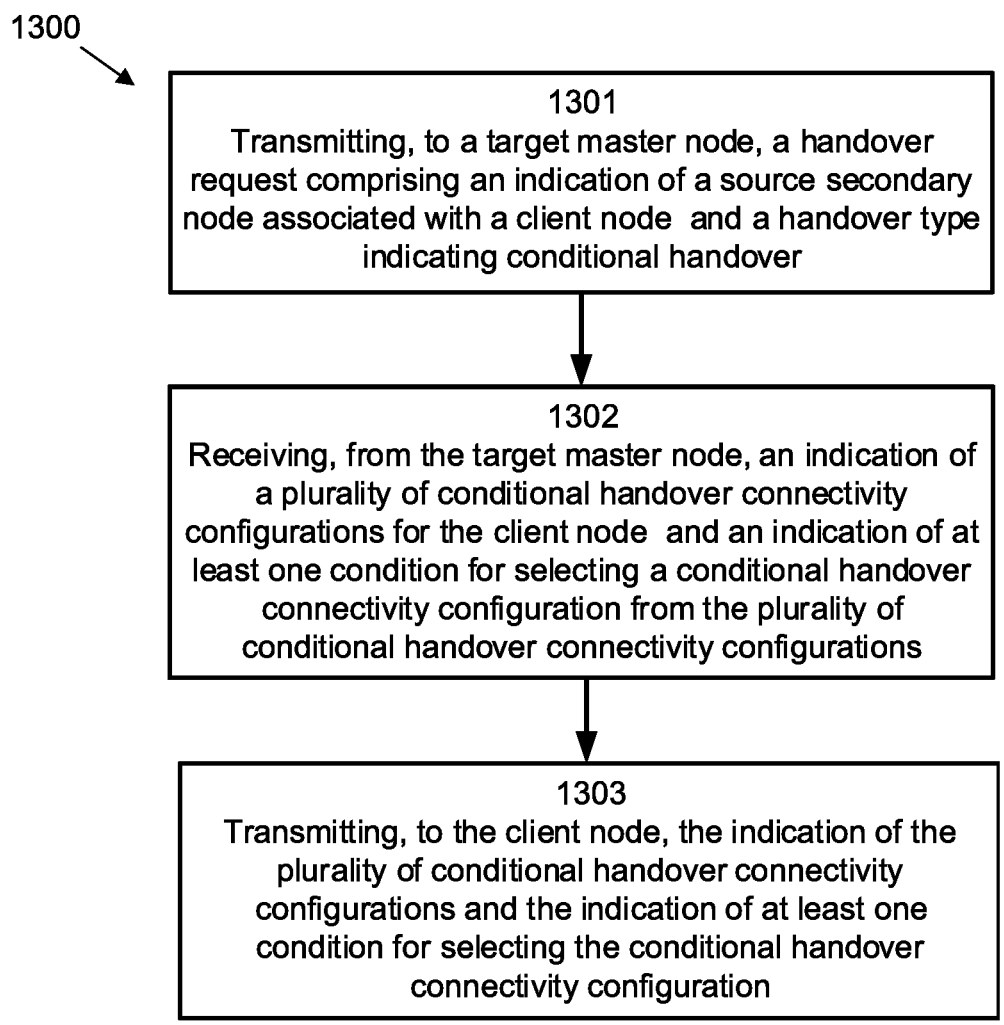
FIG. 13 illustrates an example of a method for performing handover at a network node, according to an example embodiment.

FIG. 13 illustrates an example of a method 1300 for performing handover at a network node, for example a source master node 120, according to an example embodiment.

At 1301, the method may comprise transmitting, to a target master node, a handover request comprising an indication of a source secondary node associated with a client node and a handover type indicating conditional handover.

At 1302, the method may comprise receiving, from the target master node, an indication of a plurality of conditional handover connectivity configurations for the client node and an indication of at least one condition for selecting a conditional handover connectivity configuration from the plurality of conditional handover connectivity configurations.

At 1303, the method may comprise transmitting, to the client node, the indication of the plurality of conditional handover connectivity configurations and the indication of at least one condition for selecting the conditional handover connectivity configuration.

According to an example embodiment, the plurality of conditional handover connectivity configurations may comprise a single connectivity configuration with the target master node, and a dual connectivity configuration with the target master node and a target secondary node.

According to an example embodiment, the plurality of conditional handover connectivity configurations may comprise: a single connectivity configuration with a target master node, and a dual connectivity configuration with the target master node and a source secondary node.

According to an example embodiment, the method may further comprise transmitting, to the target master node, an indication of the source master node supporting delivery of the plurality of conditional handover configurations to the client node.

According to an example embodiment, the at least one condition for selecting the conditional handover connectivity configuration comprises an active status or a non-active status of the source secondary node. The at least one condition for selecting the conditional handover connectivity configuration may comprise at least one of: detecting a release of the source secondary node; detecting a signal strength or signal quality associated with the source secondary node to be below or equal to a threshold; detecting one or more out-of-sync indications associated with the source secondary node; detecting initiation of a radio link monitoring timer associated with the source secondary node;

detecting a radio link failure associated with the source secondary node; or detecting a beam failure associated with the source secondary node.

According to an example embodiment, the method may further comprise transmitting, to the target master node, an indication of the active status or the non-active status of the source secondary node.

According to an example embodiment, the plurality of conditional handover connectivity configurations may comprise at least two of: a first dual connectivity configuration with the target master node and the source secondary node; a second dual connectivity configuration with the target master node and the target secondary node; and the single connectivity configuration with the target master node.

According to an example embodiment the method may further comprise receiving, from the target master node, at least one control message comprising at least one of: the indication of the plurality of conditional handover connectivity configurations; the at least one condition associated with the second connection for selecting the conditional handover connectivity configuration; or at least one second condition for triggering the execution of the conditional handover. The control message comprises a handover request acknowledgement message.

Different variations of the methods may be also applied, as described in connection with the various example embodiments.

An apparatus, for example a client node such as a UE 110, or a network node such as source master node 120 or target master node 130 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   at least one processor; and
   at least one memory including computer program code;
   the at least one memory and the computer code configured to, with the at least one processor, cause the apparatus at least to:
   establish a first connection to a source master node;
   establish a second connection to a source secondary node;
   receive, from the source master node, at least one indication of a plurality of conditional handover connectivity configurations, wherein the plurality of conditional handover connectivity configurations comprises:
   a single connectivity configuration with a target master node, and
   a dual connectivity configuration with the target master node and a target secondary node;
   detect triggering of execution of a conditional handover;

select a conditional handover connectivity configuration from the plurality of conditional handover connectivity configurations based on at least one condition associated with the second connection; and execute the conditional handover based on the selected conditional handover connectivity configuration.

2. The apparatus according to claim 1, wherein the at least one condition associated with the second connection comprises an active status or a non-active status of the source secondary node.

3. The apparatus according to claim 1, wherein the apparatus is further caused to:

select the single connectivity configuration in response to determining that the status of the source secondary node is non-active; or select the dual connectivity configuration in response to determining that the status of the source secondary node is active.

4. The apparatus according to claim 1, wherein the at least one condition associated with the second connection comprises at least one of detecting a release of the source secondary node, detecting a signal strength or signal quality associated with the source secondary node to be below or equal to a threshold, detecting one or more out-of-sync indications associated with the source secondary node, detecting initiation of a radio link monitoring timer associated with the source secondary node, detecting a radio link failure associated with the source secondary node, or detecting a beam failure associated with the source secondary node; and wherein the apparatus is further caused to select the single connectivity configuration in response to detecting the at least one condition.

5. The apparatus according to claim 1, wherein the plurality of conditional handover connectivity configurations comprises:

a first dual connectivity configuration with the target master node and the source secondary node;

a second dual connectivity configuration with the target master node and the target secondary node; and the single connectivity configuration with the target master node.

6. The apparatus according to claim 5, wherein the apparatus is further caused to:

select the first dual connectivity configuration in response to not detecting a secondary node change from the source secondary node to the target secondary node prior to the triggering of the execution of the conditional handover; and select the second dual connectivity configuration in response to detecting the secondary node change prior to the triggering of the execution of the conditional handover.

7. The apparatus according to claim 1, wherein the apparatus is further caused to:

receive, from the source master node, at least one control message comprising at least one of:

the indication of the plurality of conditional handover connectivity configurations;

the at least one condition associated with the second connection for selecting the conditional handover connectivity configuration; or at least one second condition for triggering the execution of the conditional handover.

8. The apparatus according to claim 7, wherein at least one of the following is performed:

the at least one second condition for triggering the execution of the conditional handover comprises an A3 event;

the at least one control message comprises a handover type indicating conditional handover;

the at least one control message comprises a radio resource control connection reconfiguration message; or the at least one control message comprises a radio resource control connection reconfiguration message including a handover command.

9. An apparatus comprising:

at least one processor; and at least one memory including computer program code;

the at least one memory and the computer code configured to, with the at least one processor, cause the apparatus at least to:

receive, from a source master node, a handover request associated with a client node, wherein the handover request comprises an indication of a source secondary node associated with the client node and a handover type indicating conditional handover;

prepare a plurality of conditional handover connectivity configurations for the client node, wherein the plurality of conditional handover connectivity configurations comprises:

a single connectivity configuration with a target master node, and a dual connectivity configuration with the target master node and a target secondary node;

transmit, to the source master node, an indication of the plurality of conditional handover connectivity configurations and an indication of at least one condition for selecting a conditional handover connectivity configuration from the plurality of conditional handover connectivity configurations upon triggering of the conditional handover.

10. The apparatus according to claim 9, wherein the at least one condition for selecting the conditional handover connectivity configuration comprises an active status or a non-active status of the source secondary node.

11. The apparatus according to claim 9, wherein the at least one condition for selecting the conditional handover connectivity configuration comprises at least one of:

detecting a release of the source secondary node;

detecting a signal strength or signal quality associated with the source secondary node to be below or equal to a threshold;

detecting one or more out-of-sync indications associated with the source secondary node;

detecting initiation of a radio link monitoring timer associated with the source secondary node;

detecting a radio link failure associated with the source secondary node; or detecting a beam failure associated with the source secondary node.

12. The apparatus according to claim 10, wherein the apparatus is further caused to:

receive, from the source master node, an indication of the active status of the source secondary node;

receive a connection request from the client node; and execute the conditional handover based on the dual connectivity configuration.

13. The apparatus according to claim 10, wherein the apparatus is further caused to:

receive, from the source master node, an indication of the non-active status of the source secondary node;

receive a connection request from the client node; and execute the conditional handover based on the single connectivity configuration.

14. The apparatus according to claim 13, wherein the apparatus is further caused to:

transmit a secondary node release request to the target secondary node, in response to receiving the indication of the non-active status of the source secondary node.

15. The apparatus according to claim 9, wherein the plurality of conditional handover connectivity configurations comprises:

a first dual connectivity configuration with the target master node and the source secondary node;

a second dual connectivity configuration with the target master node and the target secondary node and the single connectivity configuration with the target master node.

16. An apparatus comprising:

at least one processor; and at least one memory including computer program code;

the at least one memory and the computer code configured to, with the at least one processor, cause the apparatus at least to:

transmit, to a target master node, a handover request comprising an indication of a source secondary node associated with a client node and a handover type indicating conditional handover;

receive, from the target master node, an indication of a plurality of conditional handover connectivity configurations for the client node and an indication of at least one condition for selecting a conditional handover connectivity configuration from the plurality of conditional handover connectivity configurations, wherein the plurality of conditional handover connectivity configurations comprises:

a single connectivity configuration with a target master node, and a dual connectivity configuration with the target master node and a target secondary node;

transmit, to the client node, the indication of the plurality of conditional handover connectivity configurations and the indication of at least one condition for selecting the conditional handover connectivity configuration.

17. The apparatus according to 16, wherein the apparatus is further caused to:

transmit, to the target master node, an indication of the source master node supporting delivery of the plurality of conditional handover configurations to the client node.

18. The apparatus according to claim 16, wherein the at least one condition for selecting the conditional handover connectivity configuration comprises an active status or a non-active status of the source secondary node.

19. The apparatus according to claim 16, wherein the at least one condition for selecting the conditional handover connectivity configuration comprises at least one of:

detecting a release of the source secondary node;

detecting a signal strength or signal quality associated with the source secondary node to be below or equal to a threshold;

detecting one or more out-of-sync indications associated with the source secondary node;

detecting initiation of a radio link monitoring timer associated with the source secondary node;

detecting a radio link failure associated with the source secondary node; or detecting a beam failure associated with the source secondary node.

* * * * *